United States Patent
Ono

(10) Patent No.: US 10,459,301 B2
(45) Date of Patent: Oct. 29, 2019

(54) LIQUID CRYSTAL DISPLAY DEVICE AND MANUFACTURING METHOD THEREOF

(71) Applicant: Panasonic Liquid Crystal Display Co., Ltd., Himeji-shi, Hyogo (JP)

(72) Inventor: Kikuo Ono, Ibaraki (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/149,858

(22) Filed: Oct. 2, 2018

(65) Prior Publication Data

US 2019/0064618 A1 Feb. 28, 2019

Related U.S. Application Data

(63) Continuation of application No. 14/198,054, filed on Mar. 5, 2014, now Pat. No. 10,120,251.

(30) Foreign Application Priority Data

May 17, 2013 (JP) ................................ 2013-105630

(51) Int. Cl.
*G02F 1/1362* (2006.01)
*G02F 1/1343* (2006.01)
*G02F 1/1335* (2006.01)

(52) U.S. Cl.
CPC .. *G02F 1/136227* (2013.01); *G02F 1/134363* (2013.01); *G02F 2001/134372* (2013.01); *G02F 2001/136218* (2013.01); *G02F 2201/121* (2013.01)

(58) Field of Classification Search
None
See application file for complete search history.

(56) References Cited

U.S. PATENT DOCUMENTS

2004/0027525 A1 2/2004 Itakura et al.
2007/0103611 A1* 5/2007 Park ................. G02F 1/134363
349/40
2008/0186440 A1 8/2008 Lim et al.
(Continued)

FOREIGN PATENT DOCUMENTS

JP 2008-191669 8/2008
WO 2008/038432 4/2008

*Primary Examiner* — Edward J Glick
*Assistant Examiner* — Anthony G Quash
(74) *Attorney, Agent, or Firm* — Hamre, Schumann, Mueller & Larson, P.C

(57) ABSTRACT

Provided is a liquid crystal display device including: gate lines formed in a first direction on a second transparent substrate; data lines formed in a second direction; first transparent common electrodes; a protective insulating film; transparent pixel electrodes arranged in the first direction and the second direction and formed so as to be opposed to the first transparent common electrodes on a surface of the protective insulating film; thin film transistors connected to the transparent pixel electrodes; a second transparent common electrode formed on the surface of the protective insulating film; and a liquid crystal layer formed on the protective insulating film, the transparent pixel electrodes, and the second transparent common electrode. The second transparent common electrode covers the gate lines and the data lines through intermediation of the protective insulating film.

9 Claims, 30 Drawing Sheets

(56) References Cited

U.S. PATENT DOCUMENTS

| | | | |
|---|---|---|---|
| 2009/0201455 A1 | 8/2009 | Murai | |
| 2010/0134744 A1* | 6/2010 | Lee .................. | G02F 1/134363 |
| | | | 349/143 |
| 2011/0267571 A1* | 11/2011 | Lee ..................... | H01L 27/1214 |
| | | | 349/141 |
| 2012/0133856 A1* | 5/2012 | Ono .................... | G02F 1/13439 |
| | | | 349/42 |
| 2014/0111749 A1* | 4/2014 | Won .................. | G02F 1/136209 |
| | | | 349/110 |
| 2014/0267997 A1* | 9/2014 | Hasegawa ......... | G02F 1/133707 |
| | | | 349/144 |

* cited by examiner

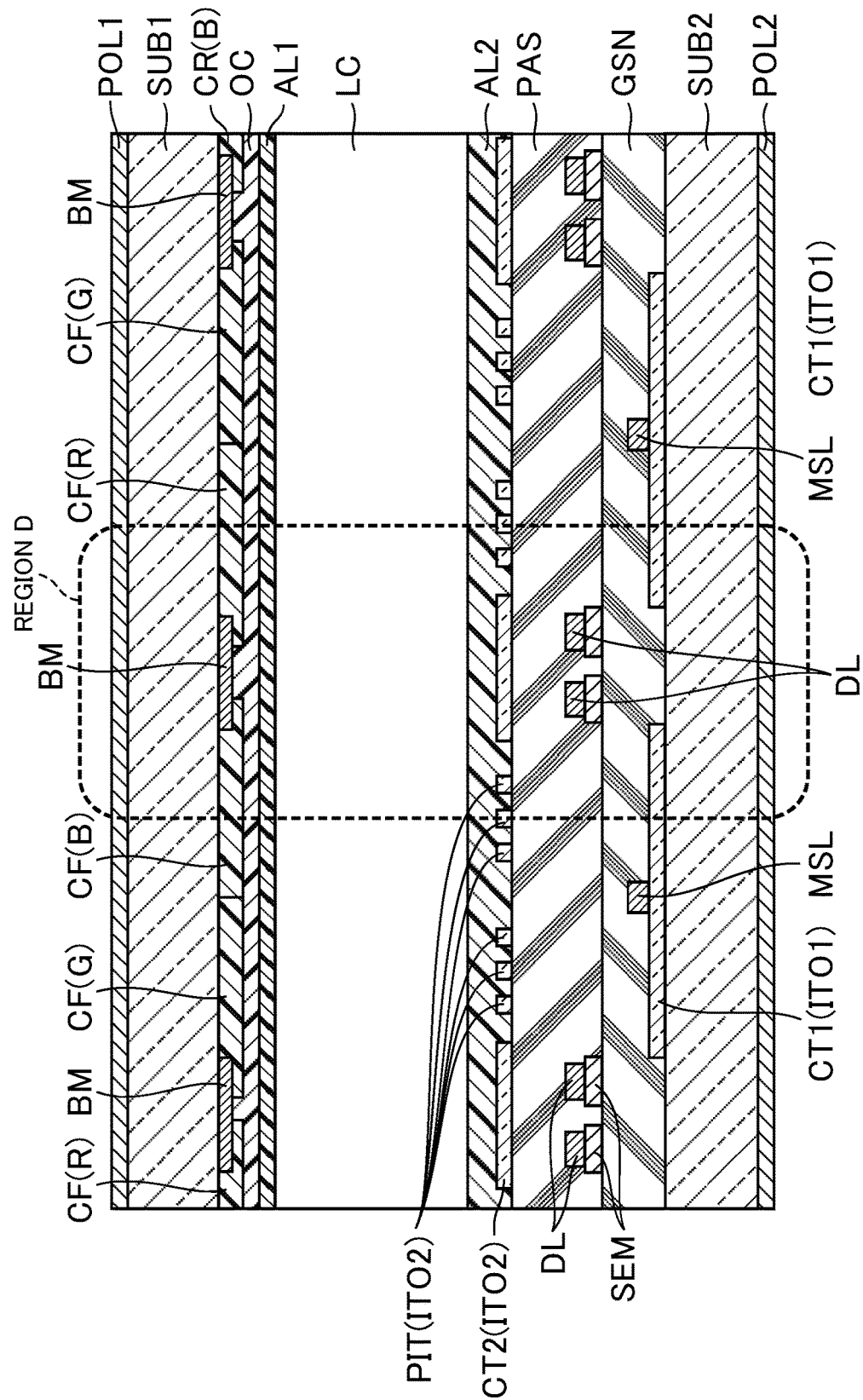

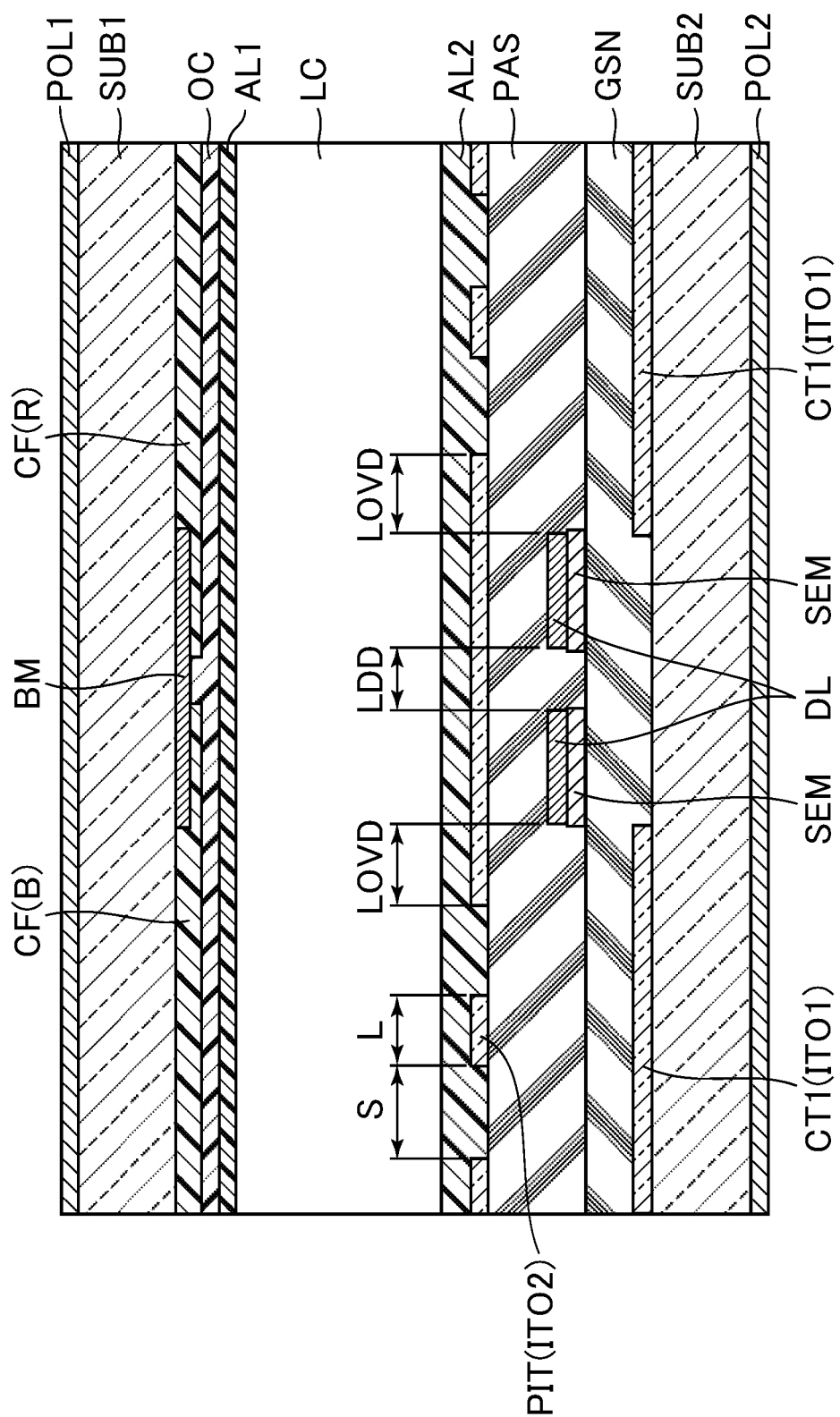

LIQUID CRYSTAL DISPLAY DEVICE AND MANUFACTURING METHOD THEREOF

CROSS-REFERENCE TO RELATED APPLICATION

The present application claims priority from Japanese application JP 2013-105630 filed on May 17, 2013, the content of which is hereby incorporated by reference into this application.

TECHNICAL FIELD

The present invention relates to a liquid crystal display device and a manufacturing method thereof.

BACKGROUND

In a liquid crystal display device, by driving pixel electrodes arranged in matrix selectively, a voltage is applied between a pixel electrode and a counter electrode, and the light transmission of liquid crystal between the pixel electrode and the counter electrode is controlled by an electric field generated therebetween, with the result that an image is displayed on a display surface.

WO2008/038432 discloses a liquid crystal display device in which, on a substrate, the light transmission of liquid crystal is controlled by an electric field generated between a common electrode formed in a layer above data wiring and a picture element electrode (pixel electrode) formed above the common electrode through intermediation of an insulating film or the like.

The liquid crystal display device having a configuration disclosed in WO2008/038432 is generally manufactured by seven or eight times of photolithography treatment. The manufacturing cost of the liquid crystal display device rises as the number of times of photolithography treatment increases.

The present invention has been made in view of the above-mentioned problem, and it is an object of the present invention to provide a liquid crystal display device and a manufacturing method thereof in which the number of times of photolithography treatment (photolithography steps) during manufacturing is reduced as compared to that of a conventional-art configuration.

SUMMARY

In one general aspect, the instant application describes a liquid crystal display device that includes: a plurality of gate lines formed in a first direction on a substrate; a plurality of data lines formed in a second direction different from the first direction on the substrate; a plurality of first transparent common electrodes formed on the substrate; an insulating film formed on the substrate, the plurality of gate lines, the plurality of data lines, and formed on the plurality of first transparent common electrodes; a plurality of transparent pixel electrodes arranged in the first direction and the second direction and formed so as to be opposed to the plurality of first transparent common electrodes on a surface of the insulating film; a plurality of thin film transistors connected to the plurality of transparent pixel electrodes; a second transparent common electrode formed on the surface of the insulating film; and a liquid crystal layer formed on the insulating film, the plurality of transparent pixel electrodes, and formed on the second transparent common electrode. The second transparent common electrode covers the plurality of gate lines and the plurality of data lines through an intermediate layer of the insulating film.

According to the embodiment of the present application, there is provided a liquid crystal display device manufactured by the following four photolithography steps: a first photolithography step of forming the plurality of first transparent common electrodes and the plurality of gate lines; a second photolithography step of forming the thin film transistor and the plurality of data lines; a third photolithography step of forming a contact hole in the insulating film; and a fourth photolithography step of forming the plurality of transparent pixel electrodes and the plurality of second transparent common electrodes on the surface of the insulating film.

The above general aspect may include one or more of the following features. The plurality of transparent pixel electrodes may be arranged in a matrix form in which the first direction corresponds to a row and the second direction corresponds to a column. A pair of gate lines may be formed between every two rows of the plurality of transparent pixel electrodes, the pair of gate lines being arranged between a plurality of transparent pixel electrodes in an upper row and a plurality of transparent pixel electrodes in a lower row, a first gate line in said pair of gate lines being connected to an upper row of the plurality of transparent pixel electrodes via at least one of the plurality of thin film transistors, and a second gate line in said pair of gate lines being connected to a lower row of the plurality of transparent pixel electrodes via at least one of the plurality of thin film transistors. The first gate line may be located closer to the upper row of the plurality of transparent pixel electrodes than the second gate line, the second gate line may be located closer to the lower row of the plurality of transparent pixel electrodes than the first gate line. The second transparent common electrode may cover the two gate lines.

According to the embodiment of the present application, an aperture ratio is improved as compared to a configuration in which the second transparent common electrode covers one gate line.

The liquid crystal display device may further include a common potential line for supplying a common potential. The common potential line may be formed in contact with the plurality of first transparent common electrodes in the first direction, and a single common potential line may be disposed for two rows of the plurality of transparent pixel electrodes.

According to the embodiment of the present application, an aperture ratio is improved as compared to a configuration in which one common potential line is disposed with respect to one row of the plurality of transparent pixel electrodes.

The plurality of transparent pixel electrodes may be arranged in a matrix form in which the first direction corresponds to a row and the second direction corresponds to a column. A pair of data lines may be formed between every two columns of the plurality of transparent pixel electrodes, the pair of data lines being arranged between a plurality of transparent pixel electrodes in a left column and a plurality of transparent pixel electrodes in a right column, a first data line in said pair of data lines being connected to a left column of the plurality of transparent pixel electrodes via at least one of the plurality of thin film transistors, and a second data line in said pair of data lines being connected to a right column of the plurality of transparent pixel electrodes via at least one of the plurality of thin film transistors. The first data line may be located closer to the left column of the plurality of transparent pixel electrodes than the second data line, the second data line may be located closer to the right column of the plurality of transparent pixel electrode than the first data line. The second transparent common electrode may cover the two data lines.

According to the embodiment of the present application, an aperture ratio is improved as compared to a configuration in which the second transparent common electrode covers one data line.

In another general aspect, a manufacturing method of a liquid crystal display device of the instant application includes laminating a first electrode material layer and a first wiring material layer on a substrate; forming, by photolithography, a plurality of first transparent common electrodes from the first electrode material layer and a plurality of gate lines from the first wiring material layer; laminating a first insulating film, a semiconductor layer, and a second wiring material layer on the substrate, the plurality of first transparent common electrodes, and on the plurality of gate lines; forming, by photolithography, a thin film transistor from the semiconductor layer and a plurality of data lines and a plurality of source electrodes from the second wiring material layer; laminating a second insulating film on the first insulating film, the thin film transistor, the plurality of data lines, and on the plurality of source electrodes; forming, by photolithography, a contract hole in the second insulating film; laminating a second electrode material layer on the second insulating film; and forming, by photolithography, a plurality of transparent pixel electrodes and a plurality of second transparent common electrodes from the second electrode material layer on a surface of the second insulating film. The forming a plurality of transparent pixel electrodes and a plurality of second transparent common electrodes includes forming the plurality of second transparent common electrodes so as to cover the plurality of gate lines and the plurality of data lines through an intermediate layer of the second insulating film.

According to the embodiment of the present application, the liquid crystal display device is manufactured by the four photolithography steps, that is, first to fourth photolithography steps.

BRIEF DESCRIPTION OF THE DRAWINGS

FIG. 29 is a sectional view taken along the line 29-29' of the liquid crystal display device illustrated in FIG. 28.

FIG. 30 is an enlarged sectional view of a portion forming a cross-section illustrated in FIG. 29.

DETAILED DESCRIPTION

First Embodiment

Figure 1:
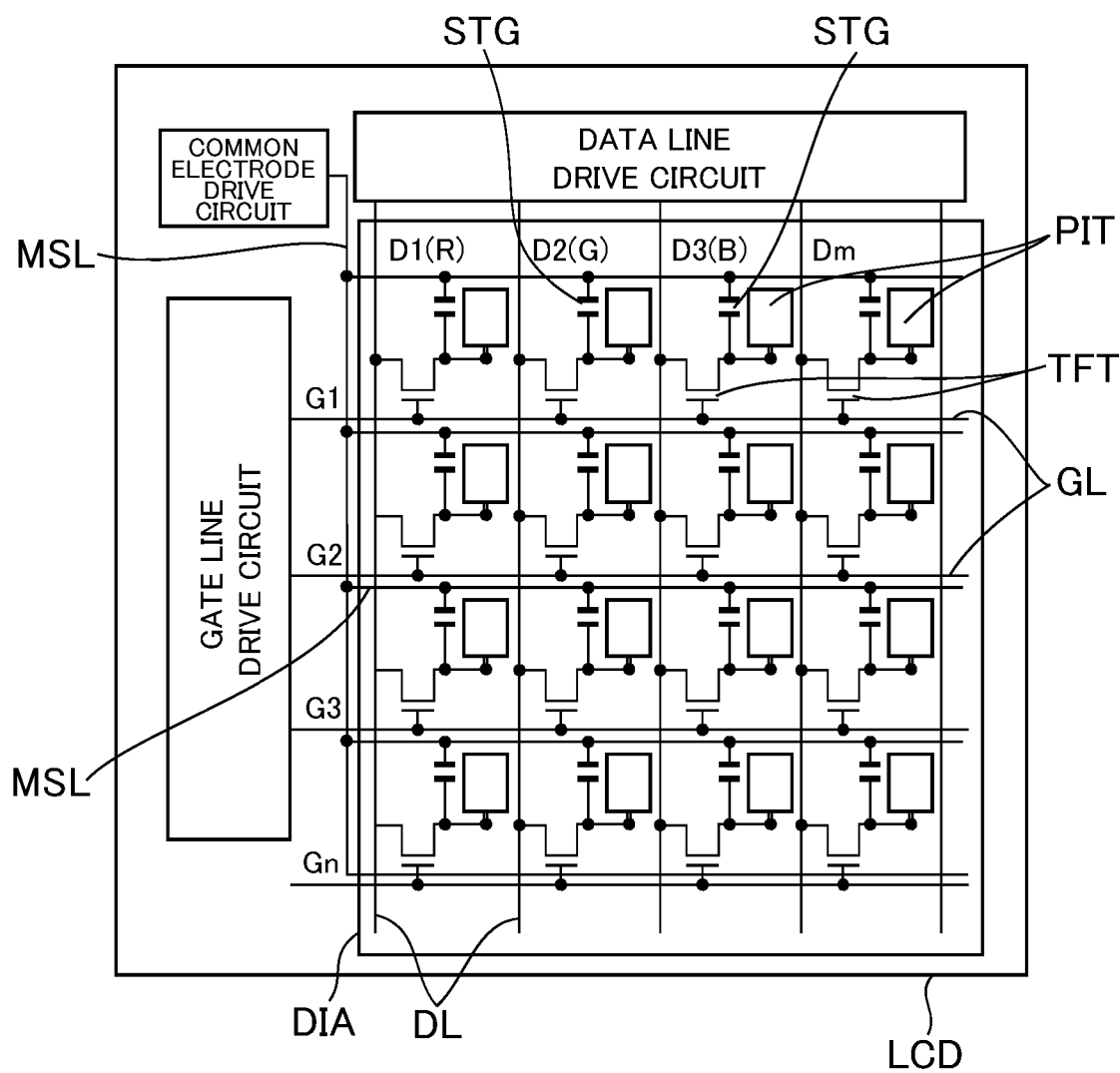
FIG. 1 is a view illustrating a system and an equivalent circuit of a liquid crystal display device according to a first embodiment of the present application.

FIG. 1 is a view illustrating a system and an equivalent circuit of a liquid crystal display device LCD according to a first embodiment of the present application. FIG. 1 illustrates a system and a circuit connecting diagram of the liquid crystal display device LCD according to the first embodiment. The liquid crystal display device LCD includes a plurality of gate lines GL formed in a first direction on a second transparent substrate SUB2, a plurality of data lines DL formed in a second direction different from the first direction on the second transparent substrate SUB2, a plurality of first transparent common electrodes CT1 formed on the second transparent substrate SUB2, a protective insulating film PAS formed above the second transparent substrate SUB2, the gate lines GL, the data lines DL, and the first transparent common electrodes CT1, a plurality of transparent pixel electrodes PIT formed so as to be arranged in the first and second directions and opposed to the respective first transparent common electrodes CT1, a plurality of thin film transistors TFT connected to the respective transparent pixel electrodes PIT, a second transparent common electrode CT2 formed on a surface of the protective insulating film PAS, and a liquid crystal layer LC formed above the protective insulating film PAS, the transparent pixel electrodes PIT, and the second transparent common electrode CT2. In this case, the transparent pixel electrodes PIT are arranged in a matrix form in which the first direction corresponds to a row and the second direction corresponds to a column.

The liquid crystal display device LCD includes an image display region DIA and a drive circuit region for driving the image display region DIA. The pixel regions are operated by active matrix display processing as follows. Specifically, the pixel regions receive supply of a gate voltage from a gate line drive circuit via gate lines G1, G2, G3, . . . , and Gn, and supply of a video data voltage from a data line drive circuit via data lines D1, D2, D3, . . . , and Dm. The thin film transistors TFT are each turned on or off to supply the data voltage to the corresponding transparent pixel electrode PIT. The liquid crystal layer LC is driven by an electric field generated between the data voltage and a common voltage supplied from a common electrode drive circuit. In order to prevent voltage reduction in the liquid crystal layer LC, a storage capacitor STG is formed in each pixel region. The common voltage is transmitted to common electrode metal wiring (common potential lines) MSL connected to the common electrode drive circuit and is propagated to a screen region by the transparent common electrodes CT. A color display is performed by applying a desired video data voltage to data lines D1(R), D2(G), and D3(B) connected to pixels of red (R), green (G), and blue (B) formed of vertical stripe-shaped color filters.

Figure 2:
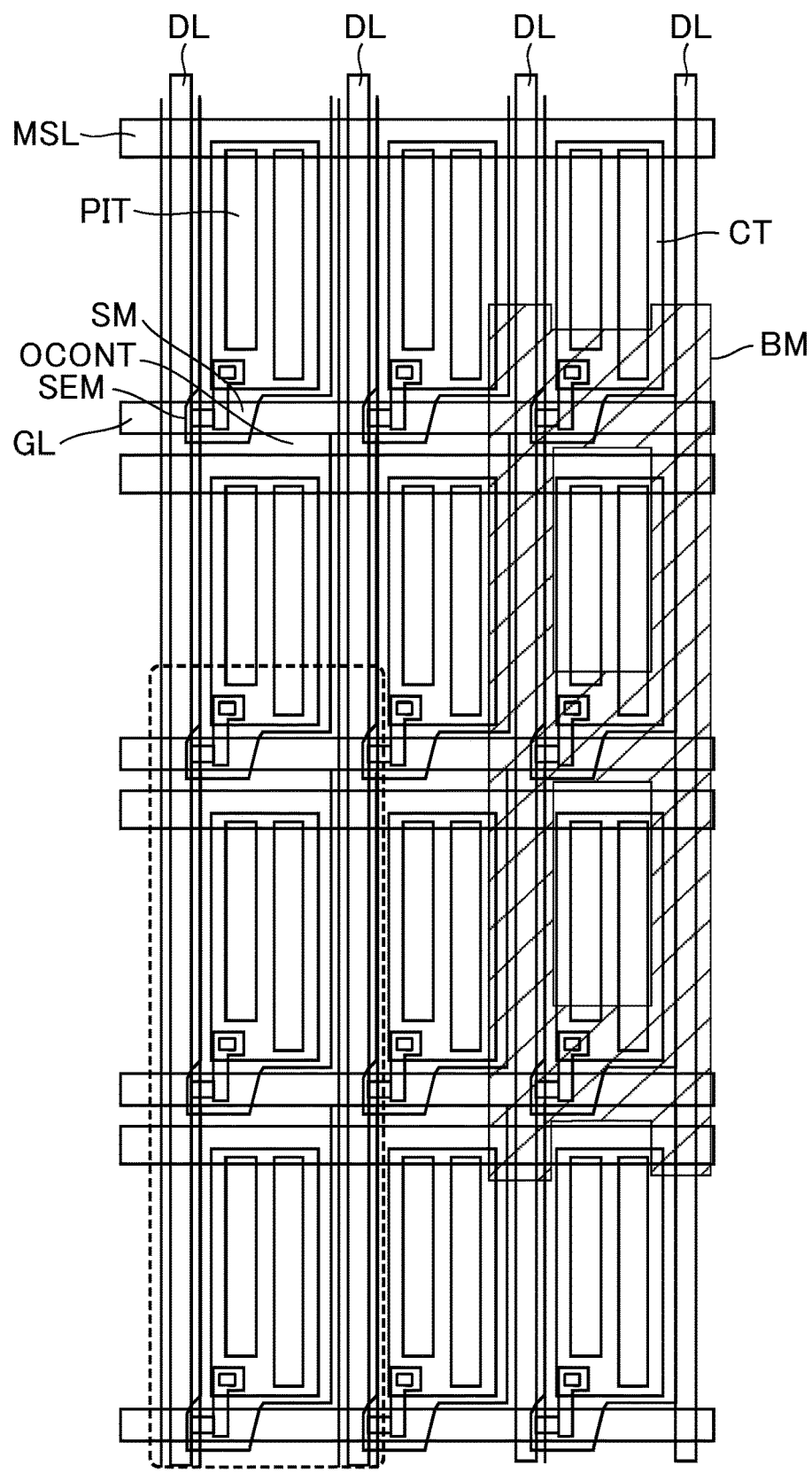
FIG. 2 is a plan view of a plurality of pixels arranged in matrix of the liquid crystal display device illustrated in FIG. 1.
Figure 3:
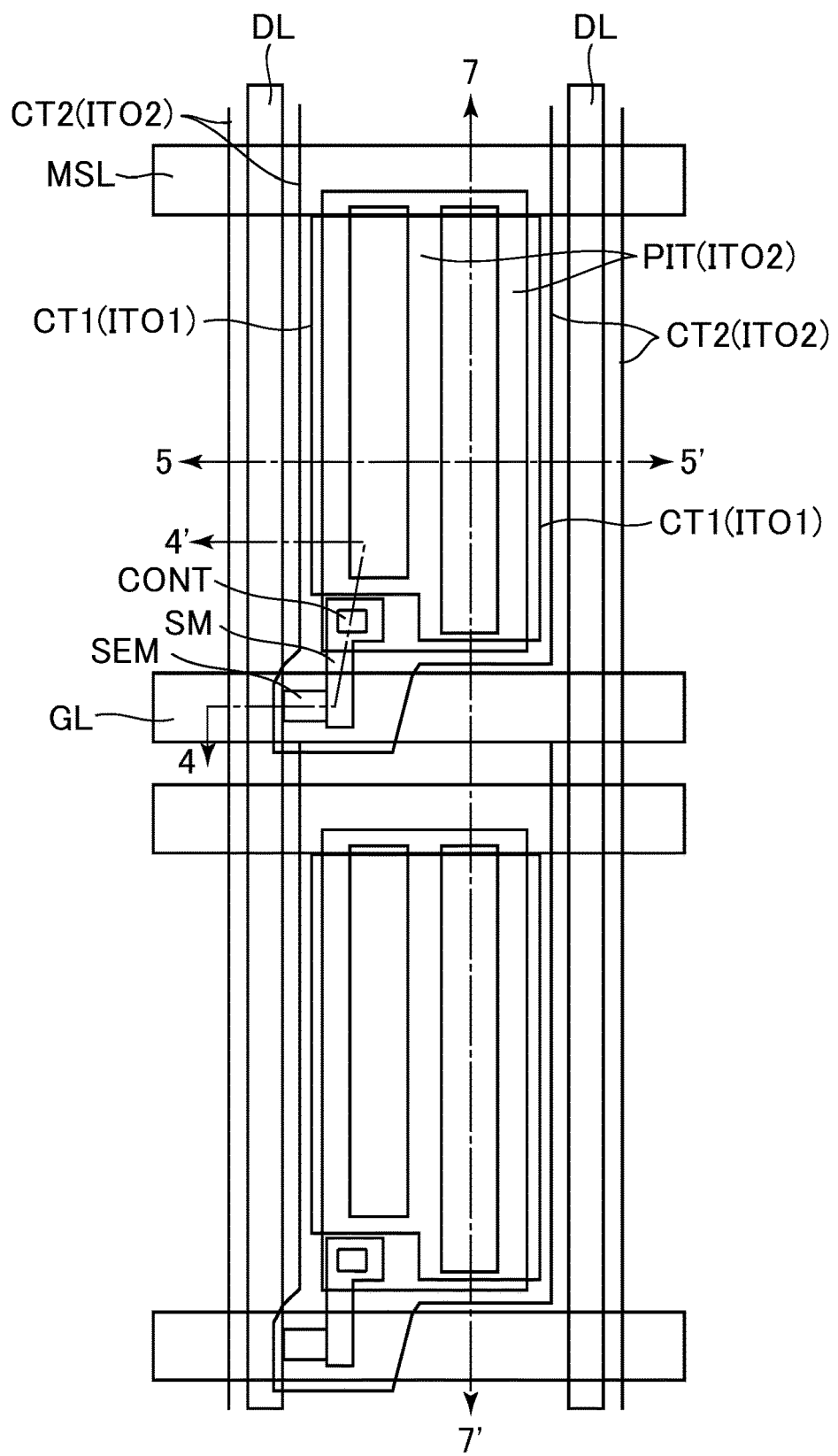
FIG. 3 is a plan view of two pixels of the liquid crystal display device illustrated in FIG. 2.
Figure 4:
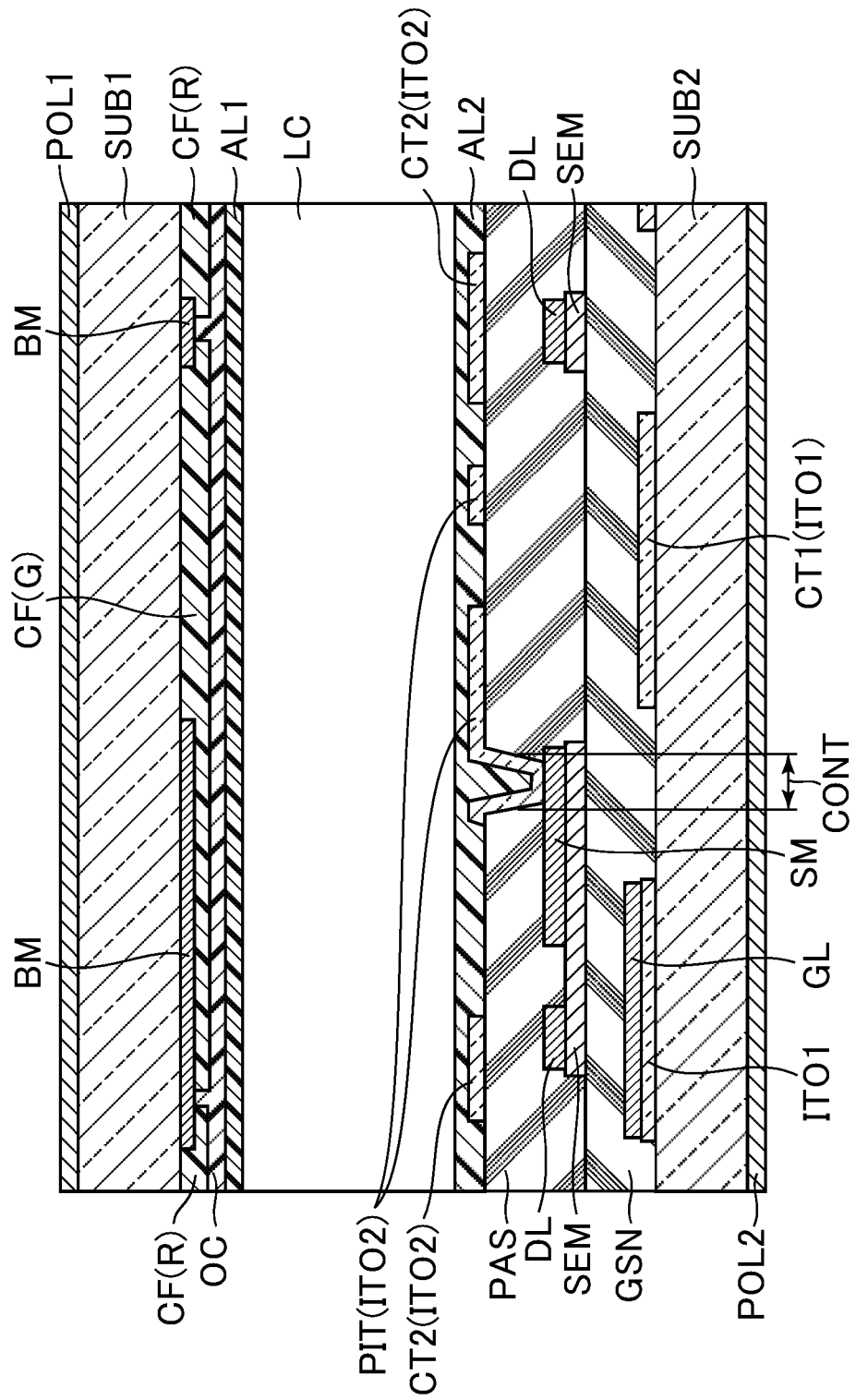
FIG. 4 is a sectional view taken along the line 4-4' of the liquid crystal display device illustrated in FIG. 3.
Figure 5:
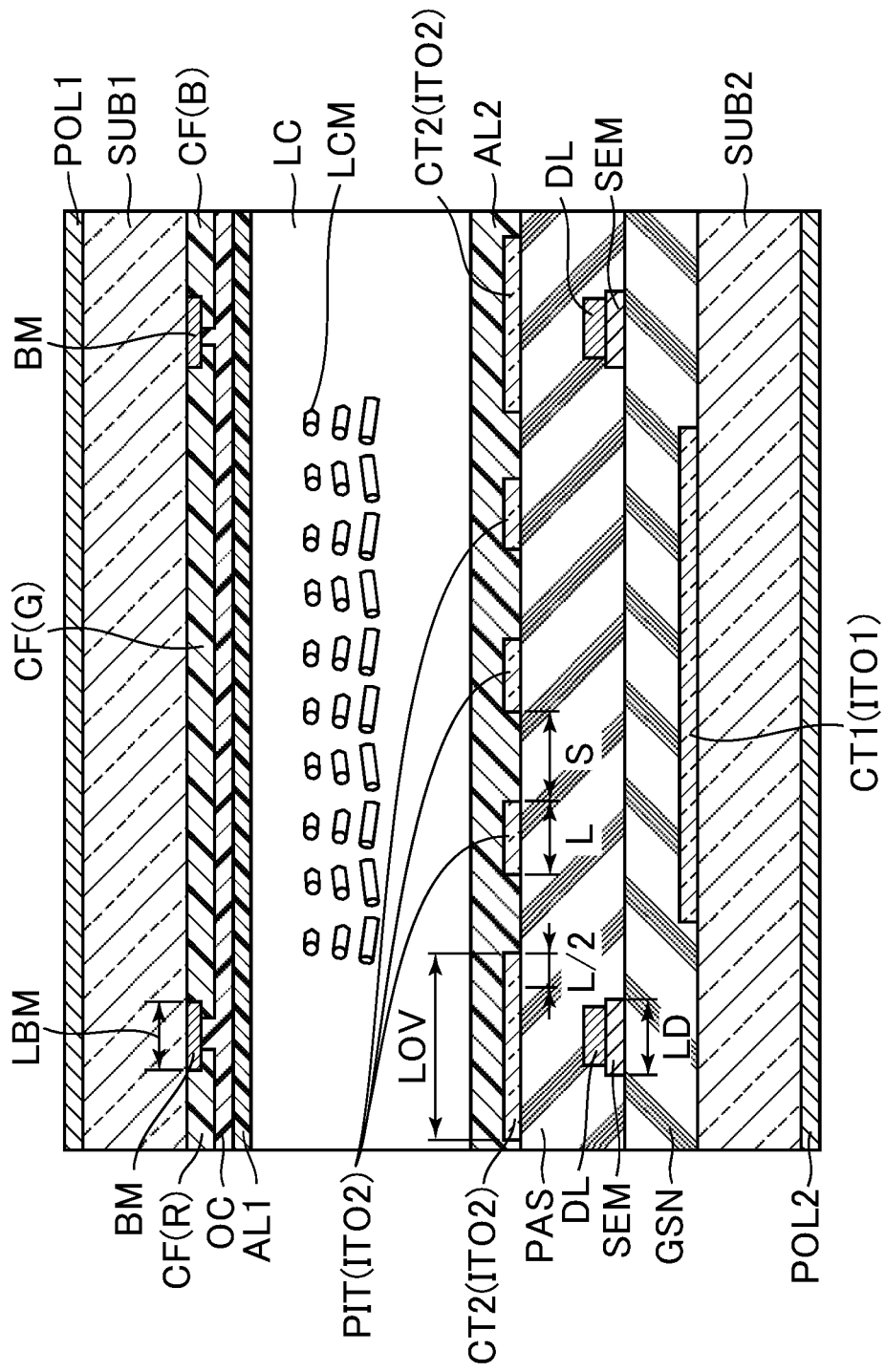
FIG. 5 is a sectional view taken along the line 5-5' of the liquid crystal display device illustrated in FIG. 3.
Figure 7:
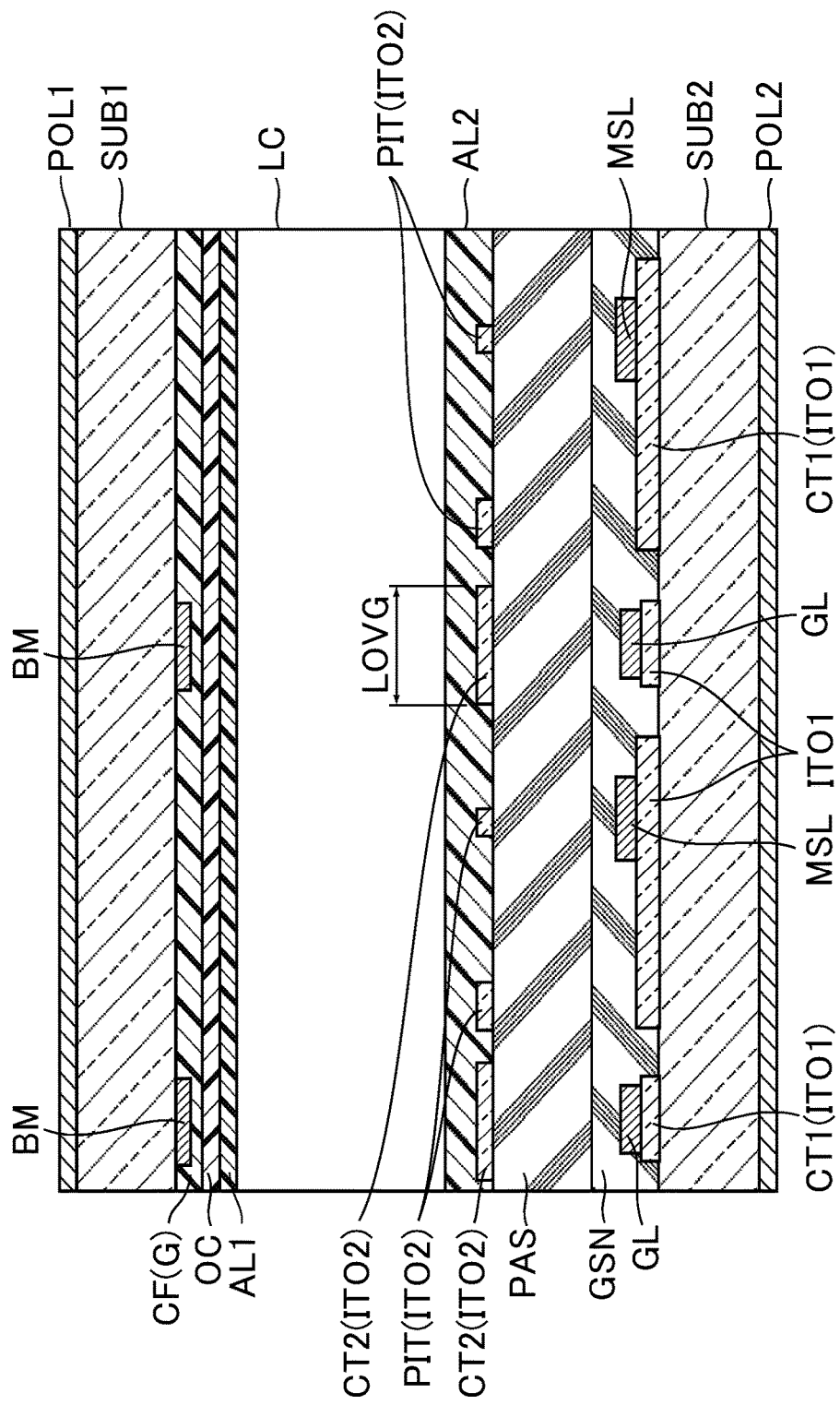
FIG. 7 is a sectional view taken along the line 7-7' of the liquid crystal display device illustrated in FIG. 3.

FIG. 2 is a plan view of a plurality of pixels arranged in matrix of the liquid crystal display device LCD illustrated in FIG. 1. FIG. 3 is a plan view of two pixels of the liquid crystal display device LCD illustrated in FIG. 2. FIG. 4 is a sectional view taken along the line 4-4' of the liquid crystal display device LCD illustrated in FIG. 3. FIG. 5 is a sectional view taken along the line 5-5' of the liquid crystal display device LCD illustrated in FIG. 3. Further, FIG. 7 is a sectional view taken along the line 7-7' of the liquid crystal display device LCD illustrated in FIG. 3.

FIG. 2 is a plan view illustrating three pixels in a horizontal direction and four pixels in a vertical direction, that is, 12 pixels taken from the liquid crystal display device LCD. Each gate line GL is wiring for supplying a gate voltage to the thin film transistors TFT, and each data line DL is wiring for supplying a video data voltage to the thin film transistors TFT. The common electrode metal wiring MSL supplies a common voltage to the transparent common electrodes CT. FIG. 2 illustrates, in two of the plurality of pixels, a planar arrangement of a black matrix BM formed on a first transparent substrate SUB1 as an example. The data lines DL and the gate lines GL or the thin film transistors TFT are covered with the black matrix BM having a light blocking effect from above, and a central portion thereof serves as an aperture portion.

FIG. 3 is a plan view illustrating a region of two pixels in FIG. 2. FIG. 3 corresponds to a region surrounded by a dotted line in FIG. 2.

The planar arrangement and a function thereof are described. The gate line GL is formed of a metal layer having low resistance and is connected to the gate line drive circuit of FIG. 1 so as to be supplied with a gate voltage. On the other hand, the data line DL is also formed of a metal layer having low resistance and is supplied with a video data voltage. When the gate line GL is supplied with a gate-on voltage, the resistance of a semiconductor layer SEM of the thin film transistor is lowered, and the voltage of the data line DL is transmitted to a source electrode SM formed of a metal layer having low resistance, with the result that the voltage of the data line DL is transmitted to the transparent pixel electrode PIT connected to the source electrode SM.

A common voltage which is the other voltage to be applied to the liquid crystal layer LC is applied to the first transparent common electrode CT1 from the common electrode drive circuit of FIG. 1 through the common electrode metal wiring MSL. A transparent electrode material for the first transparent common electrode CT1 is referred to as ITO1. The first transparent common electrode CT1 is made of the first transparent electrode material ITO1. The transparent pixel electrode PIT and the first transparent common electrode CT1 are laminated through intermediation of the protective insulating film PAS. Further, in the transparent pixel electrode PIT, a slit is formed in a display region of one pixel. An electric field extending from an upper surface of the slit to the first transparent common electrode CT1 is applied to the liquid crystal layer LC for driving liquid crystal, with the result that a display is performed.

In the embodiment of the present application, the data line DL and the gate line GL are covered from above with the second transparent common electrode CT2 which extends across a plurality of pixels through intermediation of the protective insulating film PAS. The potential of the second transparent common electrode CT2 is a shield potential, and hence an effect of blocking unnecessary electric field noise leaking from the data line DL and the gate line GL is obtained. In the absence of the blocking effect, the potential of the transparent pixel electrode PIT which has been once written causes a malfunction due to the electric field noise when the thin film transistor TFT is in an off state. In the case where the second transparent common electrode CT2 having this shied effect is not provided, it is necessary to dispose the transparent pixel electrode PIT at a position planarly far away from the data line DL and the gate line GL. Consequently, the width of the black matrix BM is enlarged and an aperture ratio is reduced, and therefore, it impossible to provide a liquid crystal display device having high brightness and low power consumption. The second transparent common electrode CT2 is made of a second transparent electrode material ITO2 formed in the same step as forming the transparent pixel electrode PIT.

The source electrode SM is connected to the transparent pixel electrode PIT through an opening portion of a contact hole CONT formed in the protective insulating film PAS. The contact hole CONT is formed with respect to each of the transparent pixel electrodes PIT of the plurality of pixels disposed at upper and lower positions.

FIG. 4 is a sectional view taken along the line 4-4' of FIG. 3. FIG. 4 illustrates a sectional structure mainly including a route of a case where a data potential is supplied from the data line DL, and, when an on-voltage is applied to the gate line GL, the resistance of the semiconductor layer SEM is lowered to transmit the data potential from the source electrode SM to the transparent pixel electrode PIT through the contact hole CONT formed in the protective insulating film PAS, and the data line DL positioned at a boundary between adjacent pixels.

Components in the sectional structure, functions thereof, and materials to be used therefor are described. The liquid crystal layer LC is interposed between two transparent substrates: the first transparent substrate SUB1 and the second transparent substrate SUB2. A positive liquid crystal containing liquid crystal molecules whose major axes are aligned in an electric field direction is sealed in the liquid crystal layer LC. The thickness of the liquid crystal layer LC is 3 µm to 4 µm. The first transparent substrate SUB1 and the second transparent substrate SUB2 are made of glass, and each thickness thereof is 0.4 mm to 0.7 mm in the course of manufacturing. However, the thickness may be finally rendered small (about 0.2 mm) in some cases when the first transparent substrate SUB1 and the second transparent substrate SUB2 with the liquid crystal layer LC sealed therebetween are formed and thereafter subjected to chemical polishing. The present invention can also be realized through use of materials other than glass, for example, plastic as a substrate material.

A first polarizing plate POL1 and a second polarizing plate POL2 are attached to outer sides of the first transparent substrate SUB1 and the second transparent substrate SUB2, respectively. In this configuration, light from a backlight unit provided on an outer side of the second polarizing plate POL2 is polarized, and the polarized light passes through the liquid crystal layer LC. Then, the polarized light having passed through the liquid crystal layer LC is elliptically polarized due to the optical birefringence effect of the liquid crystal layer LC. The elliptically polarized light further passes as linearly polarized light through the first polarizing plate POL1 provided on an outer side of the first transparent substrate SUB1. In the liquid crystal display device LCD of the present application, the first polarizing plate POL1 and the second polarizing plate POL2 are attached to the first transparent substrate SUB1 and the second transparent substrate SUB 2 so that polarization axes of the first polarizing plate POL1 and the second polarizing plate POL2 are orthogonal to each other (in so-called crossed nicols). Therefore, under no application of an electric field, even when light from the backlight unit passes through the liquid crystal layer LC, the first polarizing plate POL1 blocks the light, with the result that a black display is performed. On the other hand, when an electric field is applied to the liquid crystal layer LC mainly by a voltage between the transparent pixel electrode PIT and the second transparent common electrode CT2, the liquid crystal layer LC converts light into elliptically polarized light through the birefringence operation of the liquid crystal layer LC, and can change a transmittance in accordance with a drive voltage thereof, with the result that a gray-scale display to a white display can be performed.

A first alignment film AL1 and a second alignment film AL2 having surfaces capable of fixing the liquid crystal molecules are formed on both surfaces of the liquid crystal layer LC. The first alignment film AL1 and the second alignment film AL2 are made of polyimide serving as a main component, and liquid crystal molecules can be aligned on surfaces thereof by rubbing or irradiation of polarized ultraviolet light. A color display is realized when light passes through a color filter CF which contains a pigment as a colored layer and is formed on the first transparent substrate SUB1. The pigment may be dissolved in liquid crystal to become a stain source, and hence the surface of the color filter CF is covered with an overcoat film OC made of an organic material. The overcoat film OC also has an effect of flattening the surface.

Depending on the type of the semiconductor layer SEM, when the semiconductor layer SEM is directly irradiated with outside light, the resistance of the semiconductor layer may decrease, and thus the storage characteristics of the liquid crystal display device may be lowered, which may inhibit satisfactory image display. Therefore, the black matrix BM is formed on the first transparent substrate SUB1 and above the semiconductor layer SEM. The black matrix BM is also arranged at a boundary between pixels of the color filter CF, to thereby prevent color mixture caused when light beams of adjacent pixels are obliquely viewed. Thus, the black matrix BM provides such an effect of displaying an image without blurring. Note that, when the width of the black matrix BM is too large, the aperture ratio and the transmittance are reduced. Therefore, in order to achieve high brightness and low power consumption characteristics in a high resolution liquid crystal display device LCD, it is necessary to decrease the width of the black matrix BM as minimum as possible in a range that color mixture is not caused when obliquely viewed. The black matrix BM is made of a resin material or a metal material using a black pigment.

In a single pixel, the drive voltage is applied to one transparent pixel electrode PIT and the other first transparent common electrode CT1 when the liquid crystal layer LC is assumed as a capacitor. First, an on-voltage is applied to the gate line GL formed of a metal layer. The gate line GL is made of a metal material containing aluminum (Al), molybdenum (Mo), titanium (Ti), or copper (Cu) as a main component, a plurality of laminate layers made of the above, an alloy obtained by adding tungsten (W) or manganese (Mn) to the above-mentioned metal material, or a laminate metal layer obtained by combining the above. The gate line GL has a thickness of 100 nm to 300 nm.

Agate insulating film GSN is formed on the gate line GL. The gate insulating film GSN is made of silicon nitride formed by plasma-enhanced chemical vapor deposition (CVD). Note that, the gate insulating film GSN may be alternatively made of silicon dioxide ($SiO_2$) or alumina ($Al_2O_3$). The semiconductor layer SEM is arranged above the gate line GL, and is processed to have an island shape. The semiconductor layer is made of amorphous silicon (a-Si) when combining with silicon nitride, and is made of oxide semiconductor or low-temperature polysilicon (LTPS) when combining with silicon dioxide ($SiO_2$). As oxide semiconductor, oxide of indium, gallium, or zinc may be used.

As means for taking out current of the semiconductor layer SEM, the data line DL and the source electrode SM are formed. The data line DL and the source electrode SM are each made of a low resistance metal material formed in the same step. The metal material may be a metal material containing aluminum (Al), molybdenum (Mo), titanium (Ti), or copper (Cu) as a main component, a plurality of laminate layers made of the above, an alloy obtained by adding tungsten (W) or manganese (Mn) to the above-mentioned metal material, or a laminate metal layer obtained by combining the above.

The transparent pixel electrode PIT is connected onto the source electrode SM. The transparent pixel electrode PIT has a pattern including a linear electrode and a slit in one pixel region partitioned by the gate lines GL and the data lines DL arranged in matrix. A data voltage is transmitted to the transparent pixel electrode PIT from the data line DL through the source electrode SM when the resistance of the semiconductor layer SEM is lowered by the application of an on-voltage to the gate line GL. Charging is performed in a capacitor between the transparent pixel electrode PIT and the first transparent common electrode CT1.

The protective insulating film PAS is formed on the data line DL and the source electrode SM. As the protective insulating film PAS, silicon nitride ($SiN_3$) or silicon dioxide ($SiO_2$) can be used. The thickness of the protective insulating film PAS is 200 nm to 400 nm.

The second transparent common electrode CT2 and the transparent pixel electrode PIT are formed on the protective insulating film PAS. The second transparent common electrode CT2 and the transparent pixel electrode PIT are each made of the second transparent electrode material ITO2 containing indium, tin, or oxide, otherwise, indium, zinc, or oxide. After the second transparent electrode material ITO2 is formed into a film, a photolithography step is carried out to separately use the same material for the transparent pixel electrode PIT and the second transparent common electrode CT2 in a planar region. The second transparent common electrode CT2 covers the data line DL and the gate line GL through intermediation of the protective insulating film PAS so as to extend across a plurality of pixels, and the second transparent common electrode CT2 has a shield effect of blocking electric field noise leaking from each wiring to the liquid crystal layer LC. Consequently, the width of the black matrix BM formed on the first transparent substrate SUB1 can be shortened and an aperture ratio can be enhanced.

The transparent pixel electrode PIT is made of a transparent electrode material such as indium, tin, or oxide in the same way as in the transparent common electrode CT, and is connected to the source electrode SM through the contact hole CONT formed in the protective insulating film PAS on the source electrode SM. In the configuration of this embodiment, the second transparent common electrode CT2 exhibiting a shield effect and the transparent pixel electrode PIT are used separately through use of the second transparent electrode material ITO2 on the protective insulating film PAS.

FIG. 5 is a sectional view of a pixel surrounded by two data lines DL, which is taken along the line 5-5' of FIG. 3. FIG. 5 also illustrates a part of a cross-section of adjacent pixels. The center pixel corresponds to a color filter CF(G) of green (G) in the vertical stripe color filter CF arrangement. The left and right pixels correspond to a color filter CF(R) of red (R) and a color filter CF(B) of blue (B), respectively. At the boundary between the pixels at which the data line DL is present, the black matrix BM is formed on the inner surface of the first transparent substrate SUB1 toward the liquid crystal layer LC.

The data line DL and the black matrix BM have an effect of preventing color mixture caused by transmitted light of the backlight unit from the adjacent pixel, which is visible when the pixel defined by the color filter CF is obliquely viewed. Although the light of the backlight unit is not shown, the second transparent substrate SUB2 is irradiated with the light from the outer side of the second polarizing plate POL2 attached to the outer side of the second transparent substrate SUB2. Note that, when the widths of the data line DL and the black matrix BM are increased, there are problems in that the aperture ratio and the transmittance reduce, the luminance in display of the liquid crystal display device LCD becomes dark, and power consumption increases. In particular, those problems are the greatest challenges in a high resolution liquid crystal display device LCD, and hence a liquid crystal display device LCD in which no display failure is caused even when the black matrix BM and the data line DL are thinned is demanded.

The cross-section of FIG. 5 is divided into a pixel boundary region of the non-light-transmissive black matrix BM or data line DL, and a light-transmissive aperture region. First, the structure and operation of the aperture region are described.

In the aperture region, a video data voltage and a common voltage are applied to the transparent pixel electrode PIT and the first transparent common electrode CT1, respectively, and an electric field generated between those electrodes is applied to the liquid crystal layer LC. Depending on the intensity of the electric field, the intensity of elliptically polarized light in the liquid crystal layer LC changes to control the transmittance and display the gray-scale. The transparent pixel electrode PIT and the first transparent common electrode CT1 are formed above the second transparent substrate SUB. An electric field applied between those two electrodes is propagated to the liquid crystal layer LC, and liquid crystal molecules LCM are rotated horizontally to gray-scale control the transmittance of light. Thus, so-called in-plane switching is performed. The potential to be applied to each of the electrodes and the characteristics of the liquid crystal layer LC are set so that the transmittance of the liquid crystal display device LCD becomes maximum when a maximum voltage difference is applied to the two electrodes. When the voltage difference between the transparent pixel electrode PIT and the first transparent common electrode CT1 decreases, the transmittance decreases. As a result, a black display tends to be performed. When the voltage difference increases toward the maximum, the transmittance increases. As a result, a white display is performed. The maximum transmittance in the case where the maximum voltage difference is applied is sometimes simply expressed as a transmittance.

The liquid crystal molecules LCM of an organic material are filled in the liquid crystal layer LC. The first alignment film AL1 formed on the first transparent substrate SUB1 and the second alignment film AL2 formed on the inner surface of the second transparent substrate SUB2 have surfaces subjected to alignment processing so as to fix the major axes of the liquid crystal molecules LCM. The transparent pixel electrode PIT has an electrode width L and a slit width S. An electric field EF from the transparent pixel electrode PIT passes through the liquid crystal layer LC to be bent, and passes through the slit width S, the protective insulating film PAS, and the gate insulating film GSN to reach the first transparent common electrode CT1.

Figure 6:
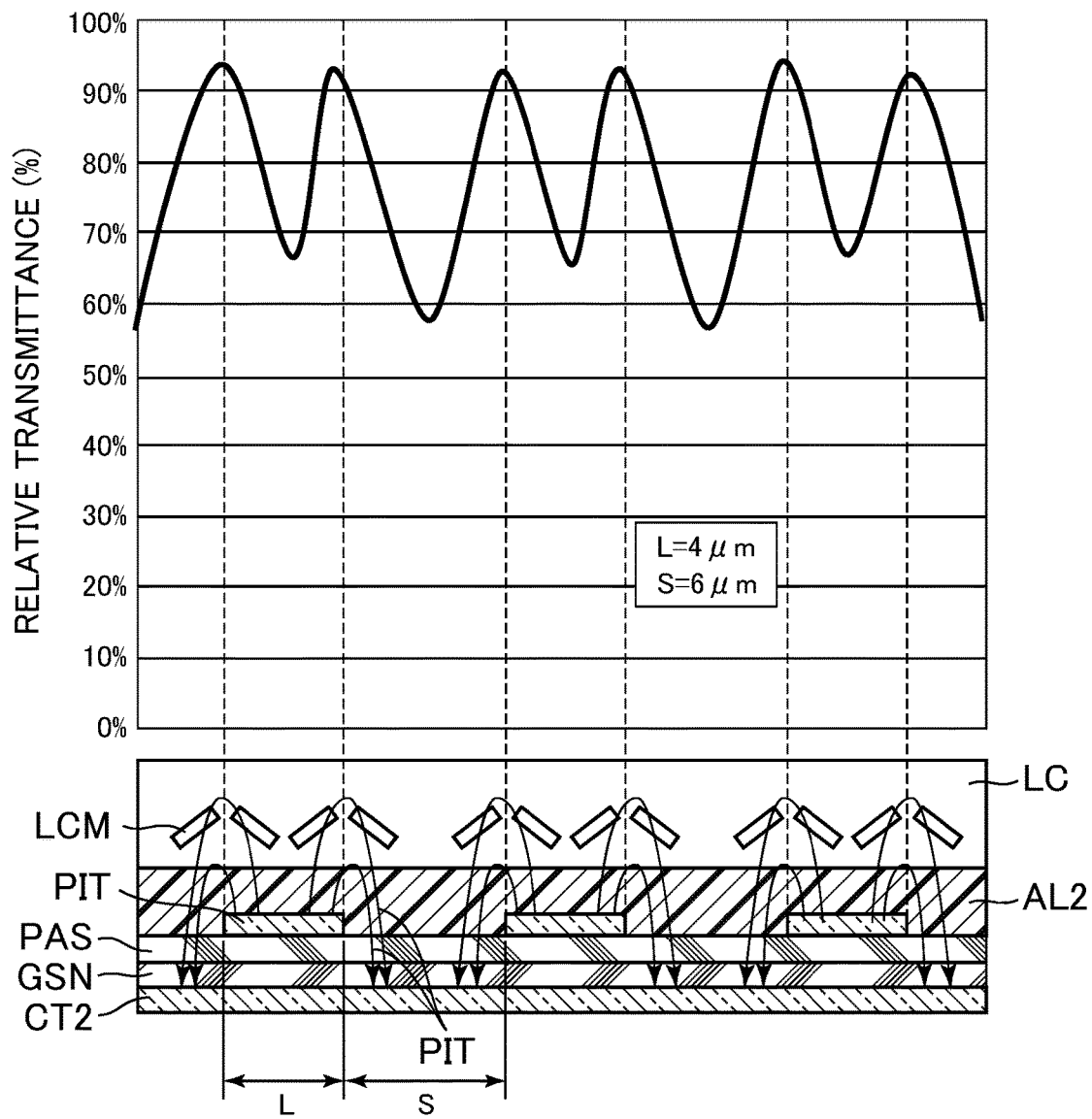
FIG. 6 shows a transmittance distribution of an aperture portion of the liquid crystal display device illustrated in FIG. 3.

FIG. 6 shows a transmittance distribution of the aperture portion of the liquid crystal display device LCD illustrated in FIG. 3. FIG. 6 shows calculation results of a transmittance distribution of an aperture region of FIG. 5. The electrode width L and the slit width S of the transparent pixel electrode PIT are 4 μm and 6 μm, respectively, as shown in FIG. 6. Although the dimension of a photomask is 5 μm, the slit width S is enlarged because the transparent pixel electrode PIT recedes by 0.5 μm during etching. The transmittance varies depending on the position in a horizontal direction of a sectional structure and increases or decreases periodically. The transmittance is a relative value. The maximum transmittance is obtained at an electrode end portion of the transparent pixel electrode PIT, which is a portion in which the electric field EF extending from the transparent pixel electrode PIT through the liquid crystal layer LC to reach the first transparent common electrode CT1 becomes maximum.

This portion is a region in which the rotation angle of liquid crystal molecules LCM in the liquid crystal layer LC becomes maximum and the transmittance becomes maximum. The transmittance decreases in the vicinity of the center of the electrode width L and in the vicinity of the center of the slit width S of the transparent pixel electrode PIT in which the electric field EF becomes weak. The reason that the transmittance in the vicinity of the center of the slit width S becomes lowest is as follows: the slit width S is larger than the electrode width L, and the electric field EF is weak. Thus, it is understood that, in the liquid crystal display device LCD of an in-plane switching (IPS) system as in this embodiment, it is necessary to set the dimensions of the electrode width L and the slit width S of the aperture portion considering that, even when the aperture portion is formed of a transparent electrode material, the transmittance decreases in the aperture portion in a far region corresponding to a half of the electrode width L or the slit width S of the transparent pixel electrode PIT or more.

Next, a relationship between the structure at a boundary between regions of adjacent pixels in which the data line DL and the black matrix BM are present of FIG. 5 and the present implementation is described based on the finding about the electrode width L and the slit width S of the transparent pixel electrode PIT in the aperture portion illustrated in FIG. 6.

The second transparent common electrode CT2 is formed above the data line DL more widely than the data line DL through intermediation of the protective insulating film PS. A width LOV of the second transparent common electrode CT2 above the data line DL is defined so that a width of the second transparent common electrode CT2 extending off the data line DL (extension width) becomes larger than ½ of the electrode width L of the transparent pixel electrode PIT in the aperture region. The reason for this is as follows. A common voltage is applied to each of both the first transparent common electrode CT1 and the second transparent common electrode CT2 arranged below and above the data line DL, which is necessary for enhancing the effect of shielding, by the second transparent common electrode CT2, the electric field noise extending upward from the data line DL and shielding, by the first transparent common electrode CT1, the electric field noise extending downward from the data line DL toward the second transparent substrate SUB2. That is, the data line DL and the second transparent common electrode CT2 are processed by different photolithography steps. Therefore, misalignment occurs. When the misalignment is great, the shield effect of the second transparent common electrode CT2 extending off the data line DL is weakened on one side to cause a malfunction. Therefore, it is necessary to set the extension width to be at least larger than a half of the electrode width L of the transparent pixel electrode PIT. Note that, in this case, as shown in FIG. 6, the transmittance on the transparent pixel electrode PIT decreases. Thus, the electric field noise from the data line DL is suppressed by forming the first transparent common electrode CT1 below the data line DL and the wide second transparent common electrode CT2 above the data line DL.

The electric field noise generated from the data line DL is prevented from entering the liquid crystal layer LC by the second transparent common electrode CT2 disposed above the data line DL more widely than the data line DL through intermediation of the protective insulating film PAS as described above. By preventing the electric field noise from entering the liquid crystal layer LC, it is possible to eliminate one of factors for vertical crosstalks corresponding to a display failure in which, for example, in the case where a small window-shaped black and white pattern is reflected on the center of a screen against a white, black, or gray background, the color of an upper and lower region of the window becomes close to the color of the background, with the result that a liquid crystal display device LCD of good image quality with a high aperture ratio can be realized.

On the other hand, in the case of using, as means for driving pixels in the liquid crystal display device LCD, column inversion or column-based inversion that is low power consumption drive which renders the polarity of a data voltage identical when one screen is scanned, the above-mentioned vertical crosstalks are also caused by another factor. The factor is electric field noise extending from the data line DL through the first transparent substrate SUB1 in a lower portion to reach the transparent pixel electrode PIT. The electric field noise occurs in the form of capacitance coupling because the transparent pixel electrode PIT is in a floating state during a holding state. In this embodiment, the first transparent common electrode CT1 is disposed on each of both lower sides of the data line DL and below the transparent pixel electrode PIT. Therefore, the electric field noise from the data line DL via the first transparent substrate SUB1 can also be blocked, and column inversion which is low power consumption drive can be used, with the result that the low power consumption with high brightness as well as the enhancement of an aperture ratio is realized.

The specific dimensions in this embodiment are as follows: the width of the data line DL is 6 µm, and the electrode width L and the slit width S of the transparent pixel electrode PIT are 4 µm and 5 µm, respectively. The width of the black matrix BM is 6 µm, and the width LOV of the second transparent common electrode CT2 above the data line DL is 12 µm. In the case where the second transparent common electrode CT2 having a shield effect is not disposed above the data line DL, the electric field noise from the data line DL spreads widely in the liquid crystal layer LC. Therefore, the transparent pixel electrode PIT needs to be disposed further away from the data line DL, and the width of the black matrix BM needs to be set to 25 µm so as to cover this region. As a result, due to the shield effect of the second transparent common electrode CT2, there is provided an effect of substantially reducing the width of the black matrix BM from 25 µm to 9 µm because the data line DL and a portion of 3 µm of the width LOV of the second transparent common electrode CT2 contribute to transmission. Thus, a liquid crystal display device LCD with high brightness and low power consumption can be realized.

FIG. 7 is a sectional view taken along the line 7-7' of the pixel plan view of FIG. 3. The common electrode metal wiring MSL is formed at the center of adjacent pixels for driving the liquid crystal layer LC with an electric field extending from the transparent pixel electrode PIT through the liquid crystal layer LC, the protective insulating film PAS, and the gate insulating film GSN to reach the first transparent common electrode CT1. The common electrode metal wiring MSL can be made of a wiring material having low resistance, to thereby reduce wiring delay of the first transparent common electrode CT1. Thus, the common electrode metal wiring MSL is directly connected to the first transparent common electrode CT1. As a material for the common electrode metal wiring MSL, a metal material containing aluminum (Al), molybdenum (Mo), titanium (Ti), or copper (Cu) as a main component, a plurality of laminate layers made of the above, an alloy obtained by adding tungsten (W) or manganese (Mn) to the above-mentioned metal materials, or a laminate metal layer using and made of a combination of the above. The thickness of the common electrode metal wiring MSL is 50 nm to 200 nm.

The common electrode metal wiring MSL is also connected to the second transparent common electrode CT2 across a plurality of pixels in an outer peripheral portion of the image display region DIA so as to be supplied with a common voltage by the second transparent common electrode CT2.

The second transparent common electrode CT2 is disposed above the gate line GL through intermediation of the protective insulating film PAS.

FIGS. 8A to 13B are views each illustrating a method of manufacturing the liquid crystal display device LCD according to the first embodiment of the present application. FIGS. 8A to 13B illustrate steps of manufacturing the thin film transistor TFT, the wiring region, and the aperture portion to be formed on the second transparent substrate SUB2 in the first embodiment. The manufacturing steps are illustrated by a plan view of one pixel and a sectional view taken along the line b-b' of the plan view. Each figure is basically shown on the basis of a photolithography step during the TFT process. Note that, a first photolithography step and a second photolithography step are each illustrated through use of two figures so as to facilitate the description of a half-tone exposure step.

Figure 8A:
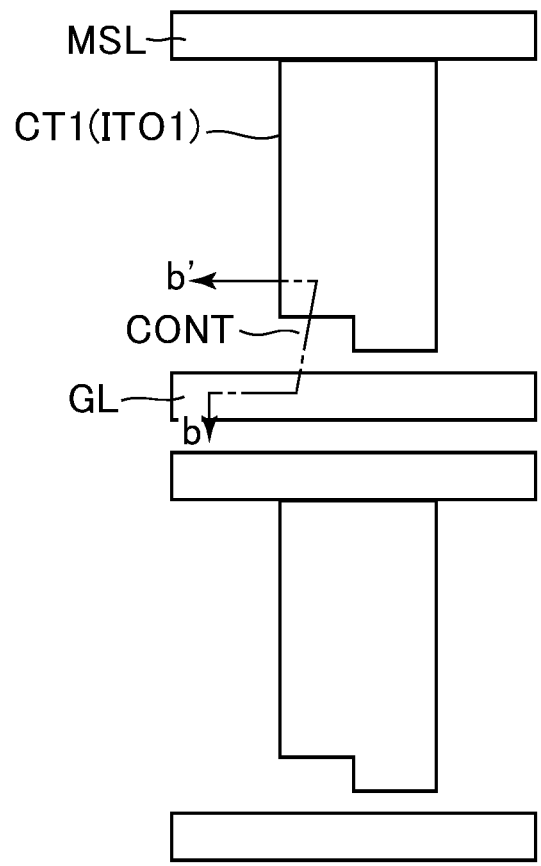
FIGS. 8A and 8B are views each illustrating a method of manufacturing a liquid crystal display device according to the first embodiment of the present application.
Figure 8B:
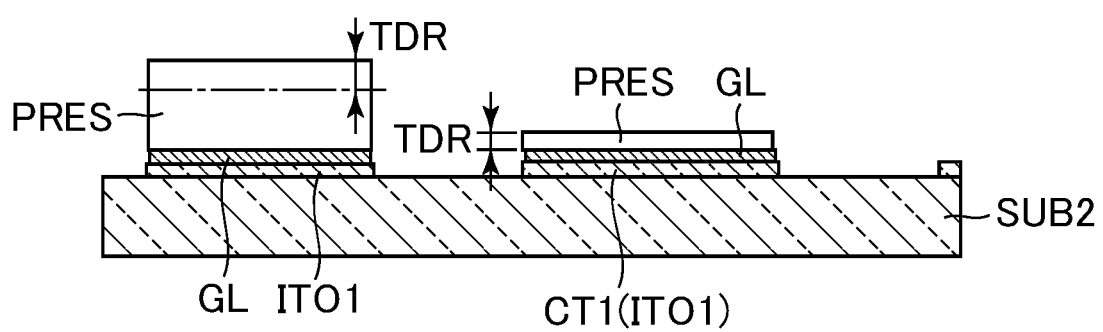
Figure 9A:
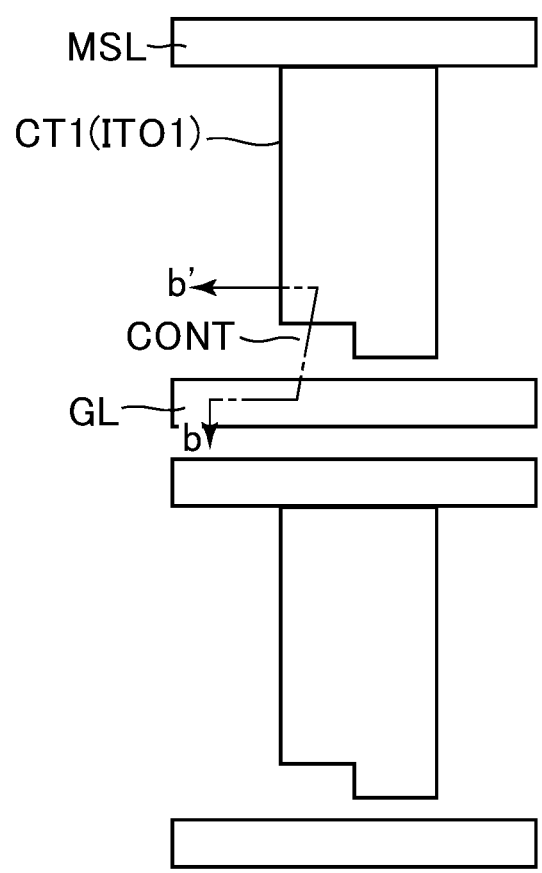
FIGS. 9A and 9B are views each illustrating the method of manufacturing a liquid crystal display device according to the first embodiment of the present application.
Figure 9B:
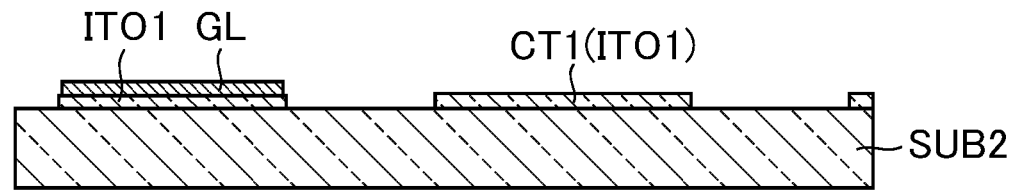

FIGS. 8A and 9A are each a plan view of one pixel and FIGS. 8B and 9B are each a sectional view taken along the line b-b' of the corresponding plan view before and after the completion of the first photolithography step of the thin film transistor TFT on the second transparent substrate SUB2. In the first photolithography step illustrated in FIGS. 8A, 8B, 9A, and 9B, patterns of two adjacent gate lines GL, the common electrode metal wiring MSL, and region of the first transparent common electrode CT1 connected to the common electrode metal wiring MSL are formed. On the second transparent substrate SUB2, a first electrode material layer made of indium, tin, or oxide served as the first transparent electrode material is formed by sputtering, and subsequently, a first wiring material layer is formed, which has a thickness of 100 nm to 300 nm and is formed of a laminated film including a copper layer and a molybdenum (Mo) layer formed on an upper surface of the copper layer. As a wiring material, not only copper (Cu) but also a laminated film of molybdenum (Mo) and aluminum (Al), a laminated film of titanium (Ti) and aluminum (Al), and MoW which is an alloy of molybdenum (Mo) and tungsten (W) can be used. A positive photoresist is applied to the laminated film. During this step, a half-tone photomask is used. In the sectional view of FIG. 8B, a photoresist PRES is formed thickly on the gate line GL and is formed thinly after exposure and development above the first transparent common electrode CT1. The reason for this is as follows: the photomask pattern has three values, that is, a light blocking film, a semi-transparent film, and a transparent region, and hence two photoresist PRES regions having different thicknesses are formed after exposure and development. When etching is performed through use of such a photoresist pattern, a region having a small thickness TDR and a region having a large thickness TDR remain as illustrated in FIG. 8B.

Subsequently, the photoresist PRES is partially removed by asking, and thus the photoresist PRES in the first transparent common electrode CT1 region can be removed. In this state, the metal wiring material having low resistance is removed by etching and the photoresist is removed to obtain the plan view and the sectional view after the completion of the first photolithography step illustrated in FIGS. 9A and 9B. Thus, the gate line GL and the common electrode metal wiring MSL are formed from the first wiring material layer, and the first transparent common electrode CT1 region is formed from the first electrode material layer through one exposure and development step with use of half-tone exposure. When the half-tone exposure is used, the first transparent electrode material ITO1 is integrally formed below the gate line GL and the common electrode metal wiring MSL.

Figure 10A:
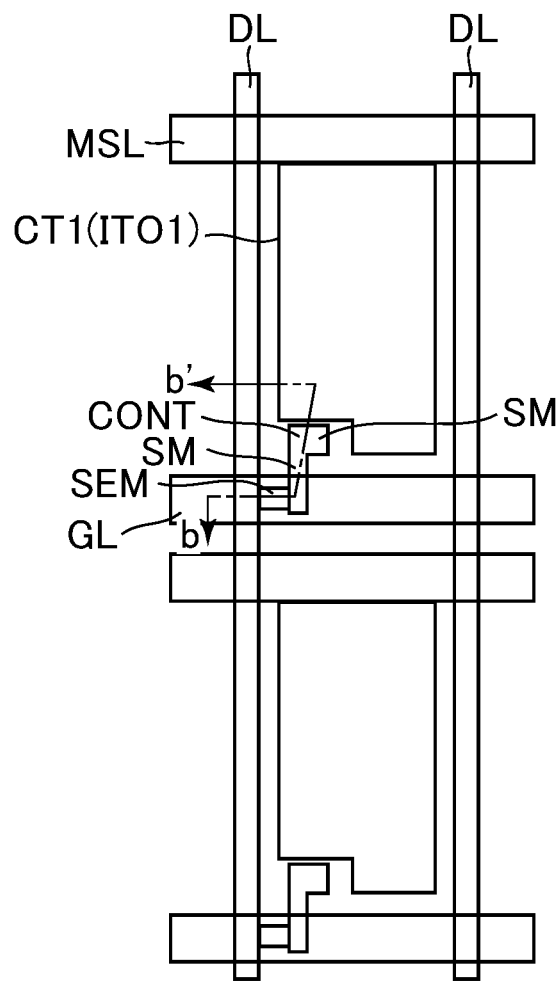
FIGS. 10A and 10B are views each illustrating the method of manufacturing a liquid crystal display device according to the first embodiment of the present application.
Figure 10B:
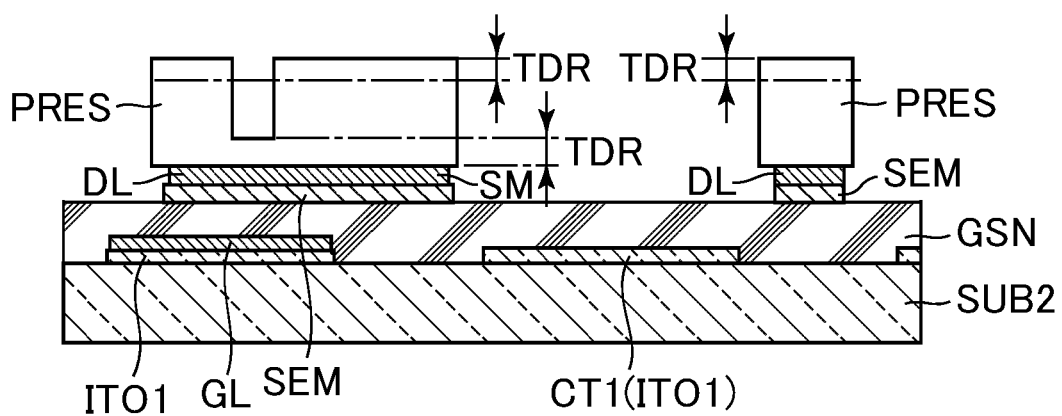
Figure 11A:
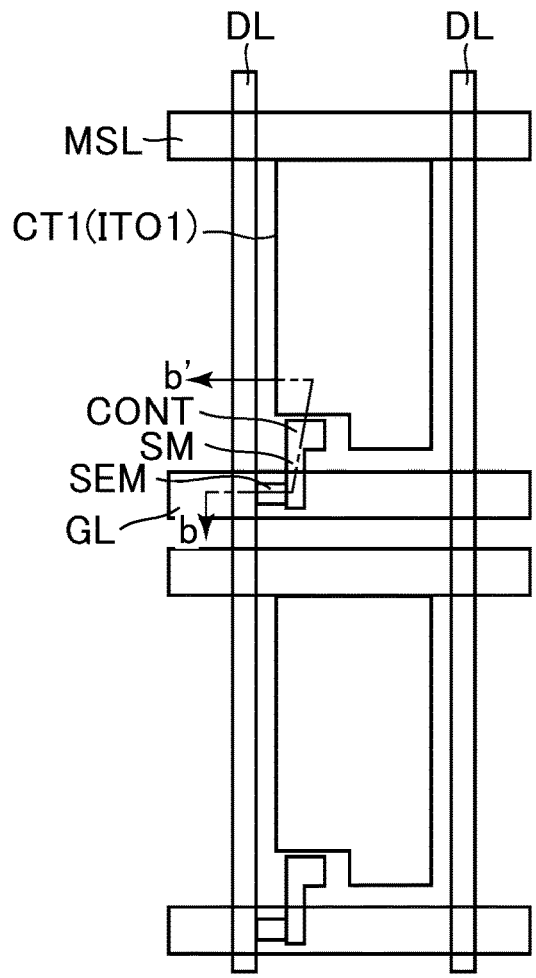
FIGS. 11A and 11B are views each illustrating the method of manufacturing a liquid crystal display device according to the first embodiment of the present application.
Figure 11B:
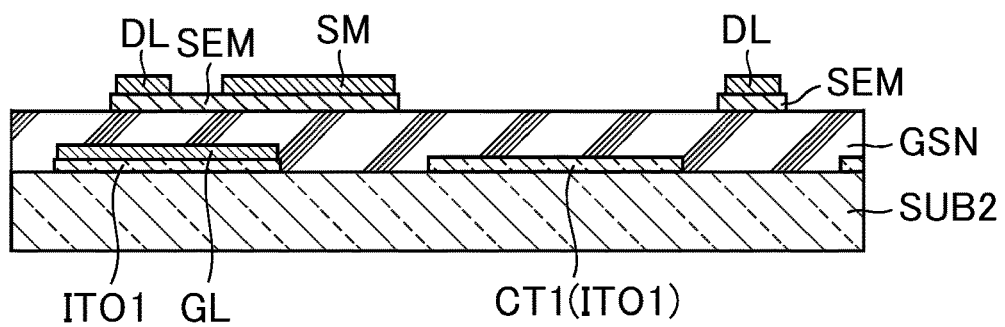

FIGS. 10B and 11B are sectional views at a time before and after the second photolithography step is completed. The gate insulating film GSN (first insulating film) of silicon nitride and the semiconductor layer SEM of amorphous silicon are laminated above the second transparent substrate SUB2, the first transparent common electrode CT1, and the gate line GL by CVD. The thicknesses of the gate insulating film GSN and the semiconductor layer SEM are about 400 nm and 200 nm, respectively. Then, a second wiring material layer formed of a laminated film of molybdenum (Mo) and copper (Cu) is formed on the semiconductor layer SEM by sputtering. The material for the metal wiring is the same as that for the gate line GL.

A photoresist is formed from an upper portion of the metal wiring, and patterned and separated through a photolithography step. Also in this step, a half-tone photomask is used. In the sectional view of FIG. 10B, the photoresist PRES is formed thickly on the data line DL and the source electrode SM, and is formed thinly after exposure and development in a channel region on the semiconductor layer SEM, in which the metal material is removed. The reason for this is as follows: the photomask pattern has three values, that is, a light blocking film, a semi-transparent film, and a transparent region, and hence two photoresist PRES regions having different thicknesses are formed after exposure and development. When etching is performed through use of such a photoresist pattern, a region having a small thickness TDR and a region having a large thickness TDR remain as illustrated in FIG. 10B.

Subsequently, when the photoresist PRES is partially removed by asking, the photoresist PRES formed on the channel region on the semiconductor layer SEM, in which the data line DL is separated from the source electrode SM, can be removed. In this state, the metal wiring material having low resistance is removed by etching and the photoresist is removed to obtain the configuration illustrated in the plan view and the sectional view after the completion of the second photolithography step illustrated in FIGS. 11A and 11B. The data line DL and the source electrode are patterned and separated on the semiconductor layer SEM. As a result of the second photolithography step, the thin film transistor TFT is formed from the semiconductor layer SEM, and the data line DL and the source electrode SM are formed from the second wiring material layer.

Figure 12A:
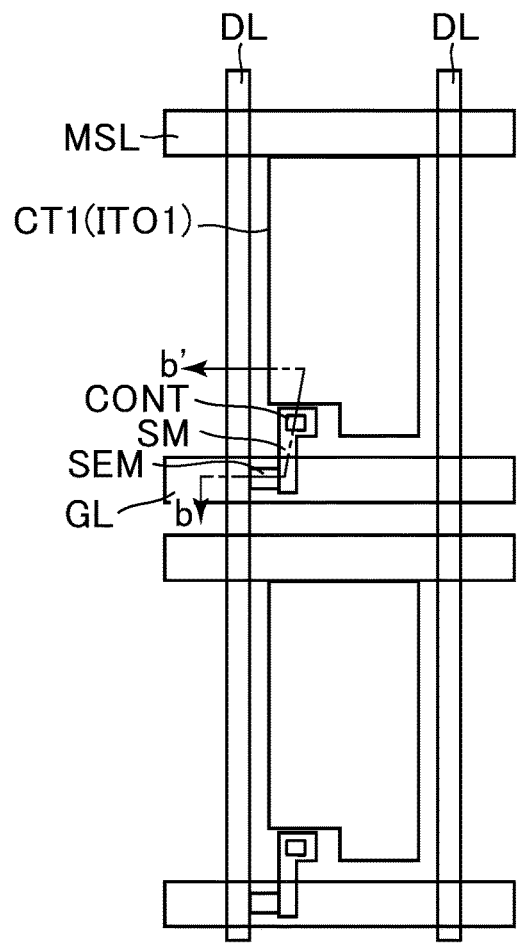
FIGS. 12A and 12B are views each illustrating the method of manufacturing a liquid crystal display device according to the first embodiment of the present application.
Figure 12B:
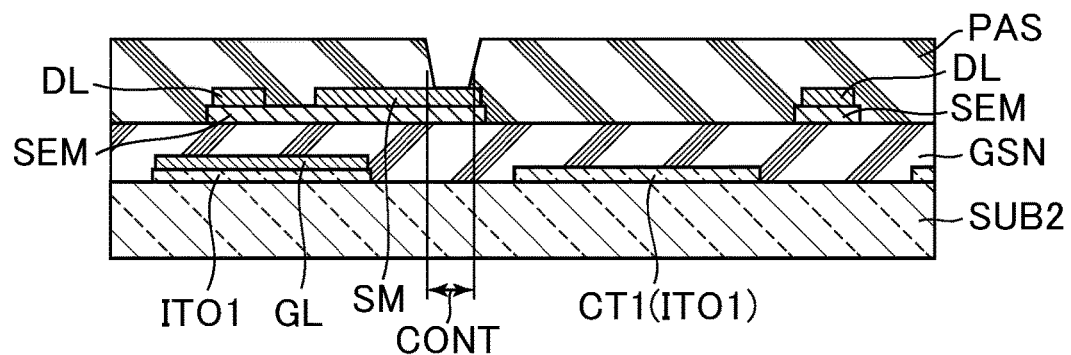
Figure 13A:
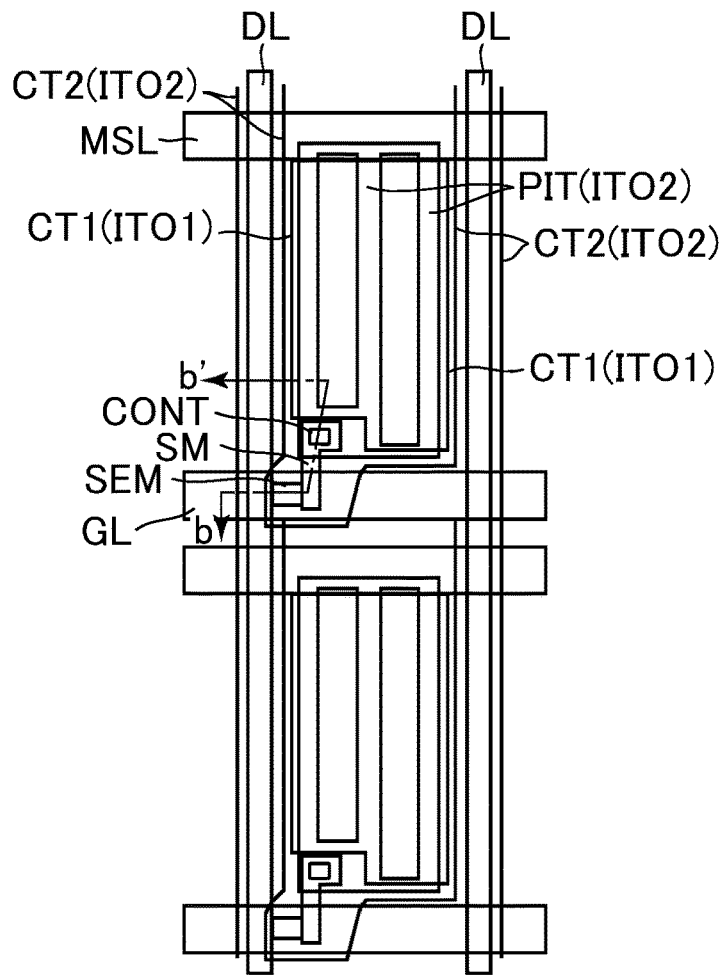
FIGS. 13A and 13B are views each illustrating the method of manufacturing a liquid crystal display device according to the first embodiment of the present application.
Figure 13B:
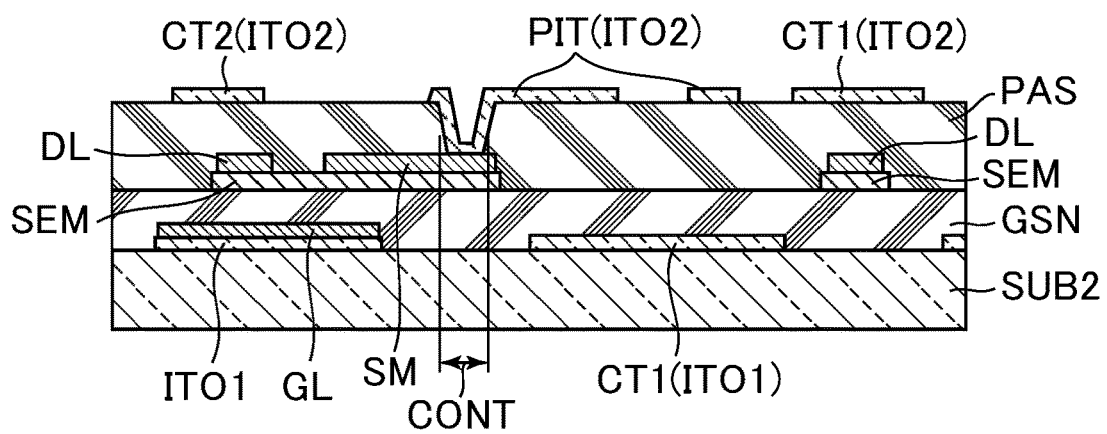

FIGS. 12A and 12B are a plan view of one pixel and a sectional view thereof after the completion of a third photolithography step. The protective insulating film PAS (second insulating film) is formed on the gate insulating film GSN (first insulating film), the thin transistor TFT, the data line DL, and the source electrode SM by CVD. The protective insulating film PAS is made of silicon nitride having a thickness of 200 nm to 400 nm. Then, the contact hole CONT is formed at a position above the source electrode SM on the protective insulating film PAS (second insulating film) by photolithography. FIGS. 13A and 13B are a plan view of one pixel and a sectional view thereof after the completion of a fourth photolithography step. The second transparent electrode material ITO2 of indium tin oxide served as a transparent electrode material is formed into a film on the protective insulating film PAS (second insulating film) to obtain a second electrode material layer. Then, the second transparent common electrode CT2 and the transparent pixel electrode PIT are formed from the second electrode material on the protective insulating film PAS (second insulating film) through photoetching. In this case, the second transparent common electrode CT2 is formed so as to cover the gate line GL and the data line DL through intermediation of the protective insulating film PAS (second insulating film).

As described above, a liquid crystal display device LCD having a high aperture ratio, high transmittance, and low power consumption can be realized through four photoetching steps. Further, the number of photolithography steps is suppressed to four, and hence cost reduction can also be achieved simultaneously.

Other embodiments of the present application are hereinafter described with reference to the drawings. Note that, the description of elements having the same functions as those of the elements described in the first embodiment is omitted. Further, unless otherwise specified, the terms defined in the first embodiment are also used in each of the following embodiments in accordance with the definitions thereof.

Second Embodiment

Figure 14:
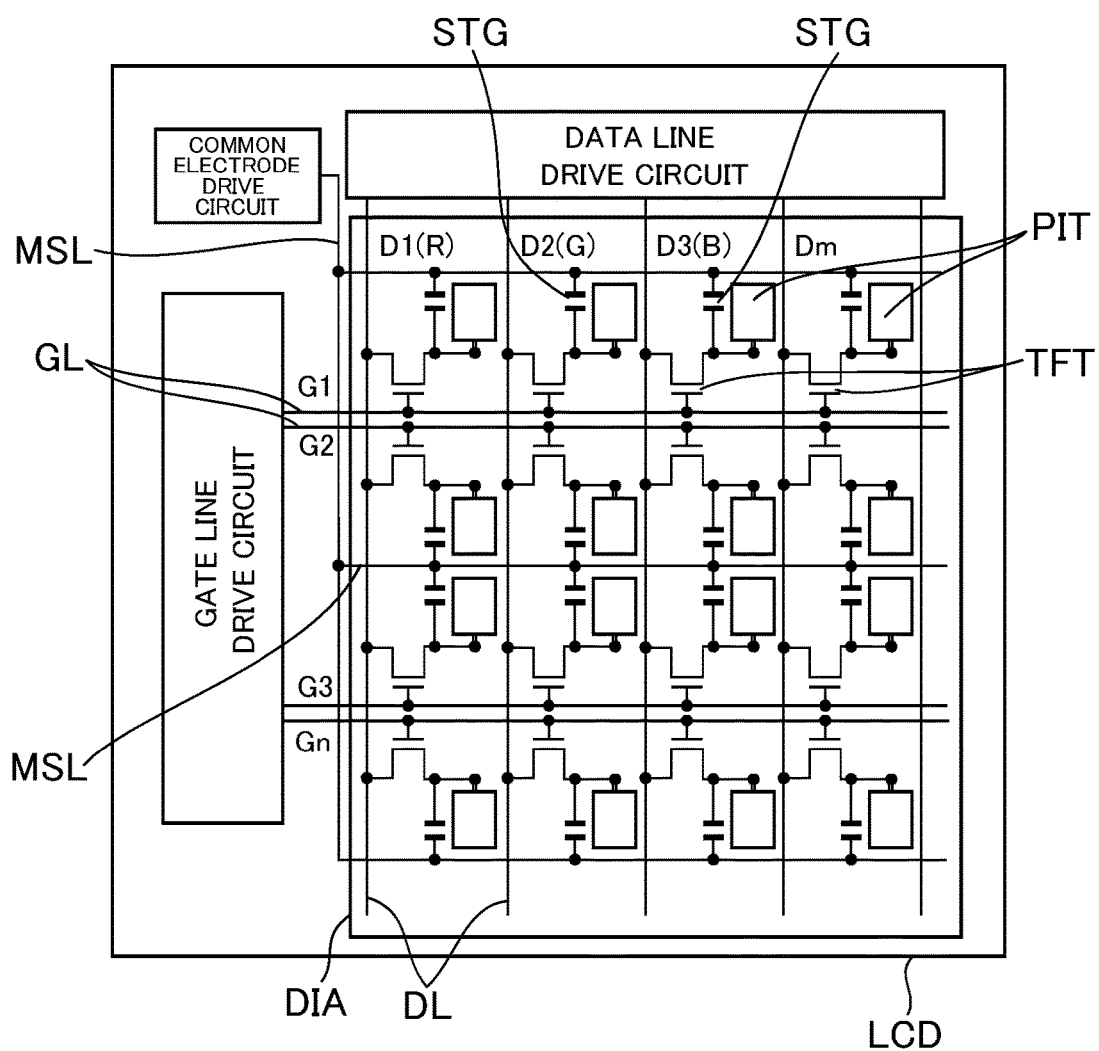
FIG. 14 is a view illustrating a system and an equivalent circuit of a liquid crystal display device according to a second embodiment of the present application.

FIG. 14 is a view illustrating a system and an equivalent circuit of a liquid crystal display device LCD according to a second embodiment of the present application, which corresponds to FIG. 1 of the first embodiment. Unlike the first embodiment, in the second embodiment, two gate lines for two upper and lower pixels are arranged in parallel, and the two pixels share one common electrode metal wiring MSL in an active matrix pixel arrangement. That is, when the above-mentioned first direction is defined as a row and the above-mentioned second direction is defined as a column, two gate lines LG formed for two rows of a plurality of transparent pixel electrodes PIT are arranged between a plurality of transparent pixel electrodes PIT in the upper row and a plurality of transparent pixel electrodes PIT in the lower row, and the two gate lines GL are each connected to the plurality of transparent pixel electrodes PIT in any one of the upper row and the lower row, which are located closer to the corresponding gate line GL, via a plurality of thin film transistors TFT. Further, the second transparent common electrode CT2 covers the two gate lines GL. The two gate lines GL extend in parallel, and further share the common electrode metal wiring MSL, with the result that an aperture ratio can be enhanced as compared to the case where the common electrode metal wiring MSL is provided to each of the two upper and lower pixels.

Figure 15:
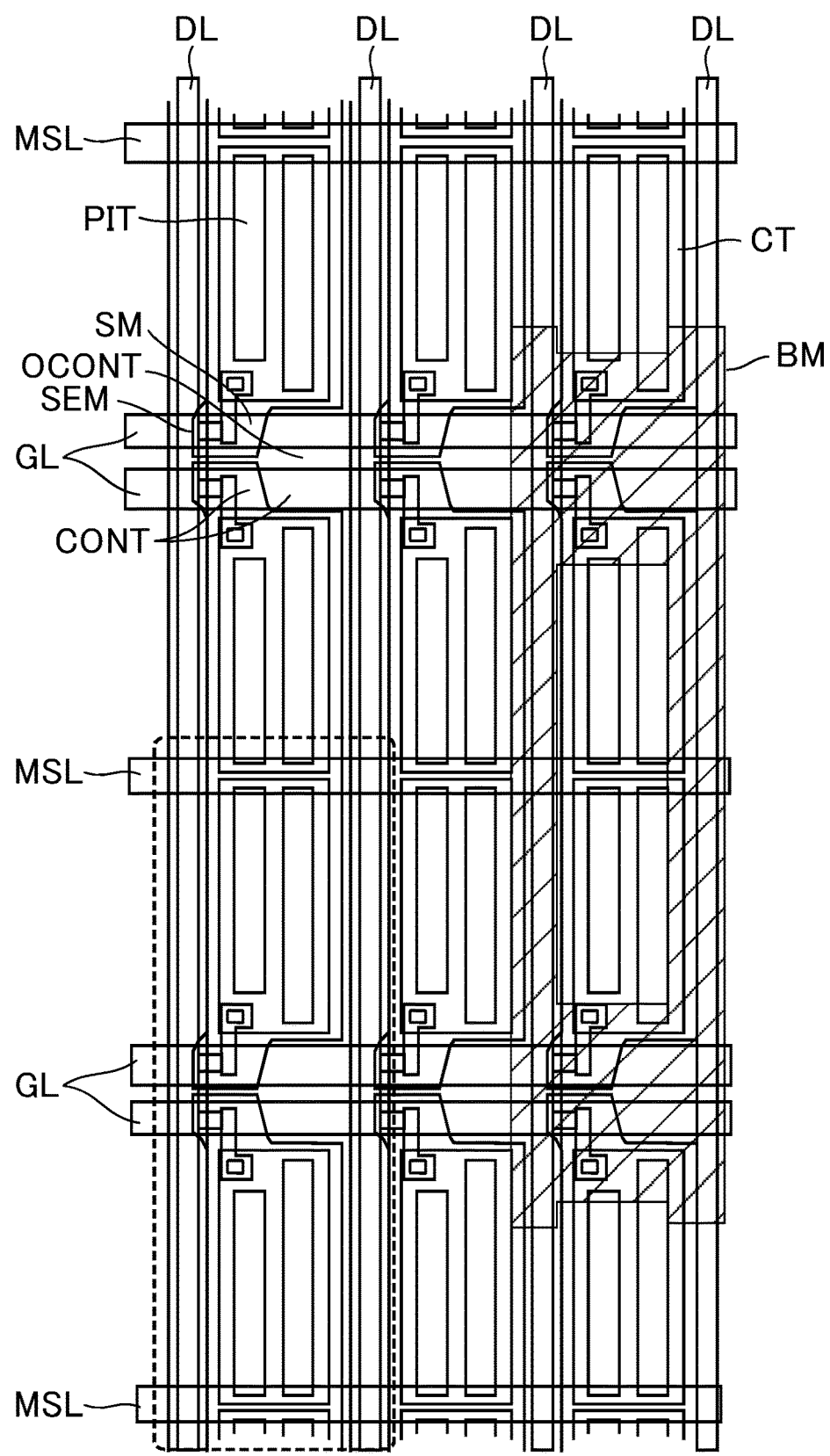
FIG. 15 is a plan view of a plurality of pixels arranged in matrix in the liquid crystal display device illustrated in FIG. 14.
Figure 16:
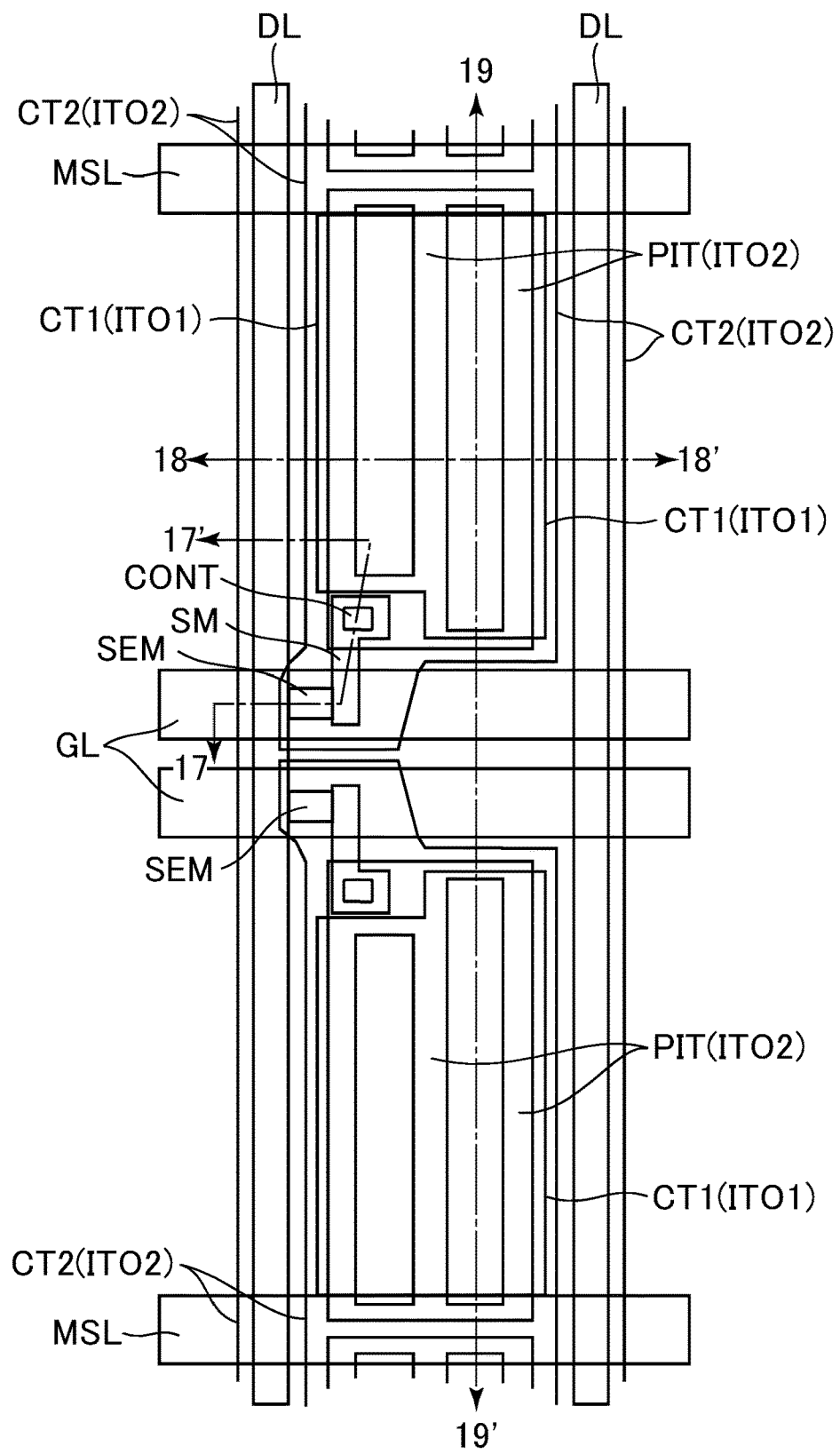
FIG. 16 is a plan view of two pixels of the liquid crystal display device illustrated in FIG. 15.
Figure 17:
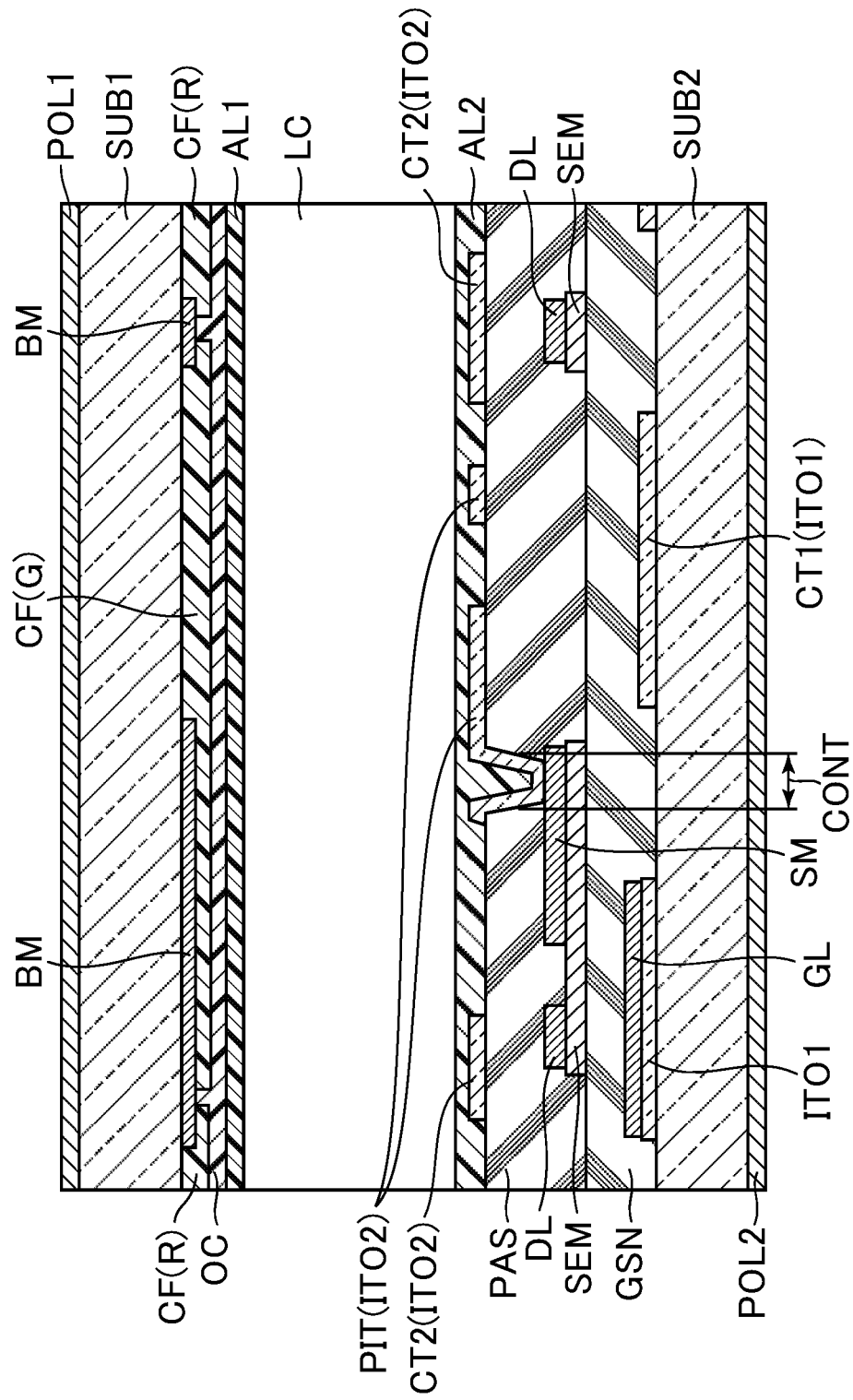
FIG. 17 is a sectional view taken along the line 17-17' of the liquid crystal display device illustrated in FIG. 16.
Figure 18:
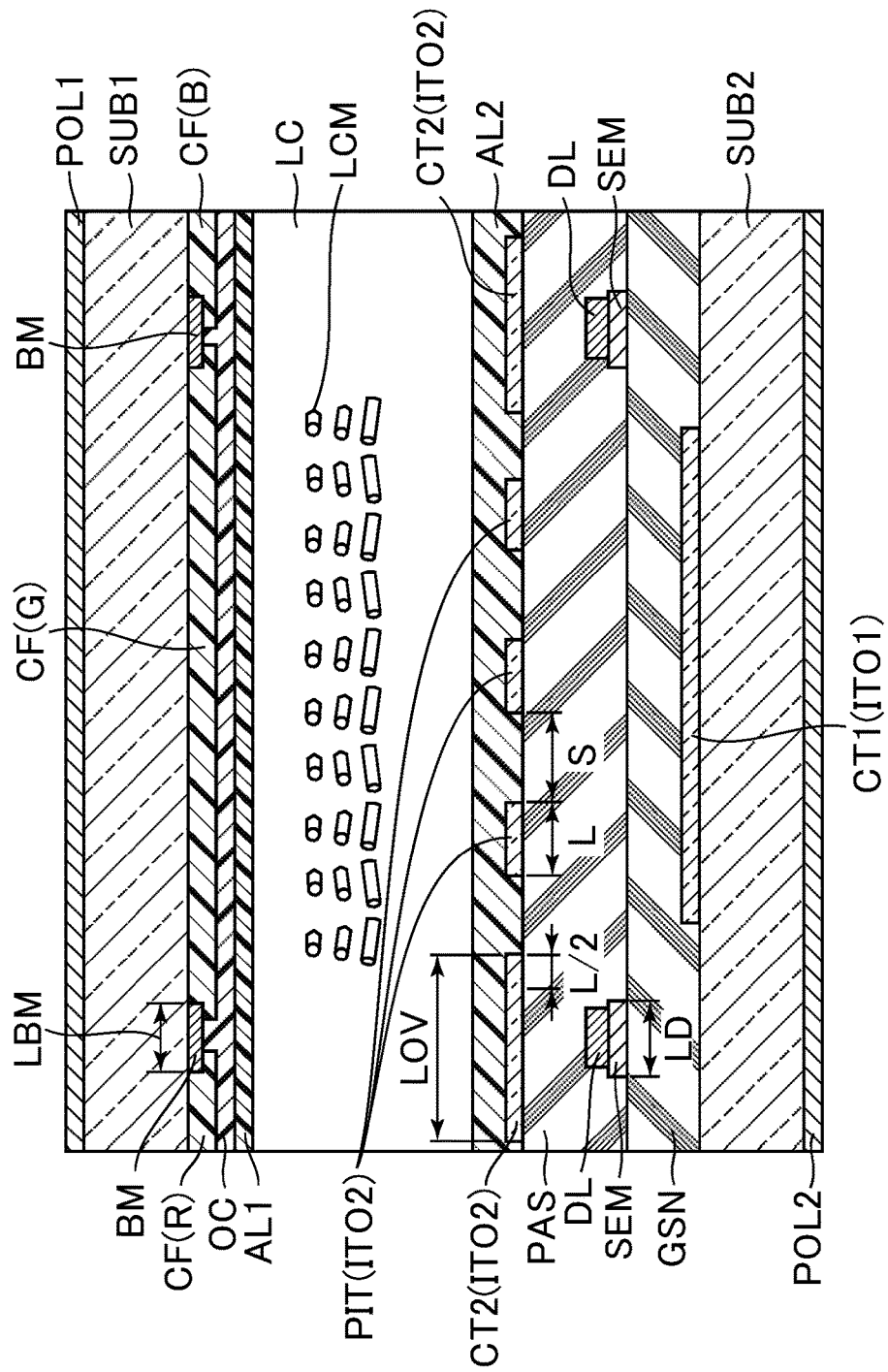
FIG. 18 is a sectional view taken along the line 18-18' of the liquid crystal display device illustrated in FIG. 16.

FIG. 15 is a plan view of a plurality of pixels arranged in matrix of the liquid crystal display device LCD illustrated in FIG. 14, which corresponds to FIG. 2 of the first embodiment. FIG. 16 is a plan view of two pixels of the liquid crystal display device LCD illustrated in FIG. 15, which corresponds to FIG. 3 of the first embodiment. FIG. 17 is a sectional view taken along the line 17-17' of the liquid crystal display device LCD illustrated in FIG. 16, which corresponds to FIG. 4 of the first embodiment. FIG. 18 is a sectional view taken along the line 18-18' of the liquid crystal display device LCD illustrated in FIG. 16, which corresponds to FIG. 5 of the first embodiment. Further, FIG. 19 is a sectional view taken along the line 19-19' of the liquid crystal display device LCD illustrated in FIG. 16, which corresponds to FIG. 7 of the first embodiment.

FIG. 15 is a plan view of three pixels in a horizontal direction and four pixels in a vertical direction, that is, 12 pixels taken from the liquid crystal display device LCD. In the second embodiment, two upper and lower pixels share one common electrode metal wiring MSL. That is, the common electrode metal wiring MSL is formed in contact with a plurality of first transparent common electrodes CT1 in the first direction, and one common electrode metal wiring MLS is disposed for two rows of a plurality of transparent pixel electrodes PIT. At a boundary of two pixels arranged in upper and lower rows, only the common electrode metal wiring MSL is present for blocking light, and no black matrix BM is formed. This configuration can also decrease variation in an aperture ratio caused by misalignment between the first transparent substrate SUB1 and the second transparent substrate SUB2, and consequently, the aperture ratio of each pixel can be enhanced.

Figure 19:
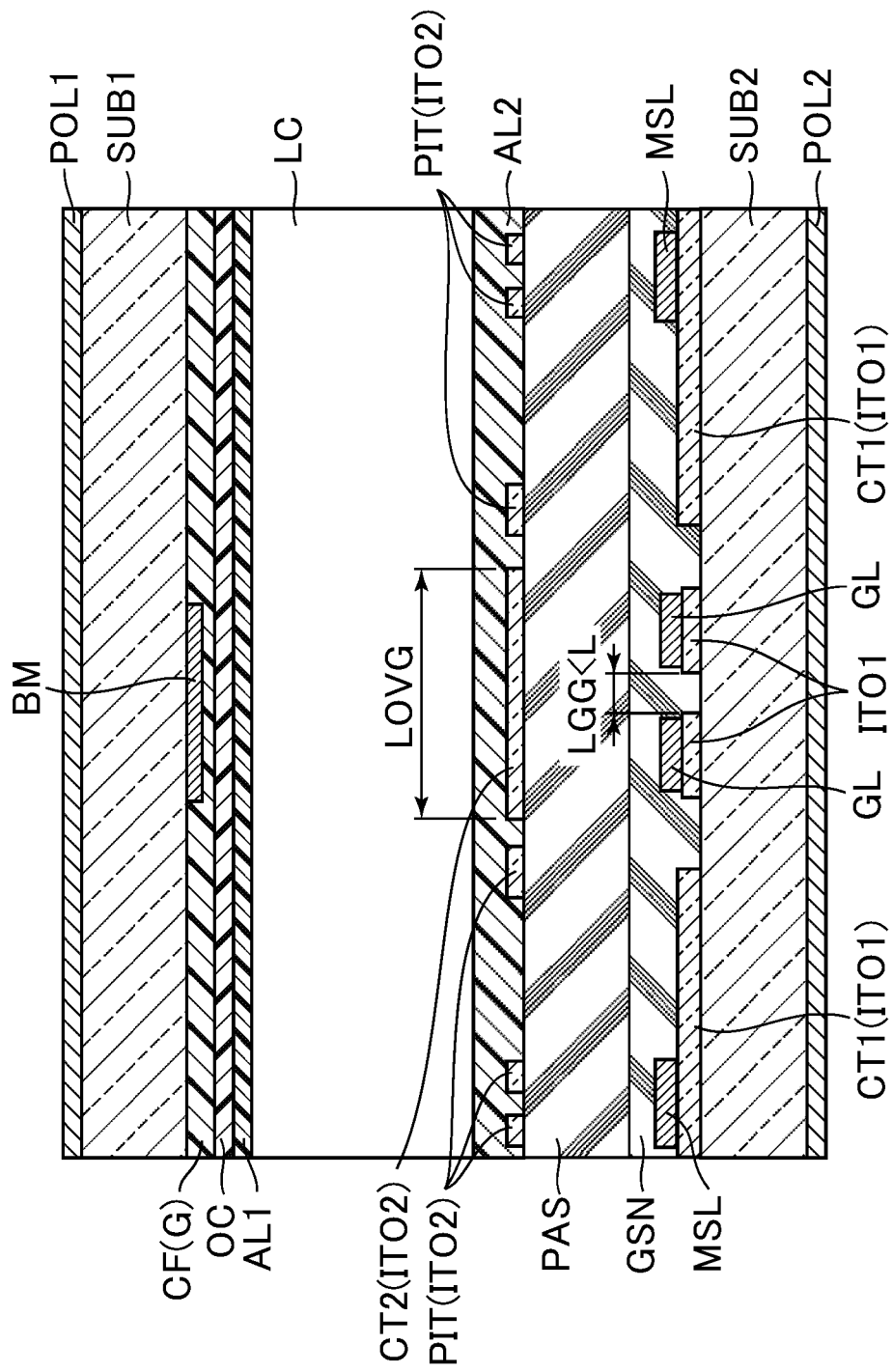
FIG. 19 is a sectional view taken along the line 19-19' of the liquid crystal display device illustrated in FIG. 16.

As illustrated in FIG. 19, unlike the first embodiment, in the second embodiment, the common electrode metal wiring MLS supplies a common voltage to not only a plurality of pixels arranged in an extending direction of a gate line but also the second transparent common electrodes CT2 which extend across two upper and lower pixels arranged in an extending direction of a source line. The common electrode metal wiring MSL is connected in the outer peripheral portion of the image display region DIA so as to be supplied with a common voltage. The common electrode metal wiring MSL is made of a metal material having low resistance, and hence the width thereof can be set to be the same as that of the first embodiment in which the common electrode metal wiring MSL is formed for each pixel. Thus, in the second embodiment, the common electrode metal wiring MSL is shared by two upper and lower pixels, and hence an aperture ratio is enhanced. Further, the common electrode metal wiring MSL is formed of an opaque material, and hence a boundary of pixels can be formed even without disposing the black matrix BM on the first transparent substrate SUB1. The alignment accuracy between the first transparent substrate SUB1 and the second transparent substrate SUB2 is low, and hence the aperture ratio can also be enhanced by the removal of the black matrix BM.

Further, in the second embodiment, the second transparent common electrode CT2 is disposed above the two gate lines GL arranged in parallel through intermediation of the protective insulating film PAS. In order to enhance a shield effect as described above, it is necessary that the width LOVG of the second transparent common electrode CT2 above the gate lines GL be set to be large. In the second embodiment, the gate lines GL extend in parallel for two rows of pixels. Therefore, as compared to the case where the gate lines GL are disposed at an equal interval for each pixel as in the first embodiment, the width LOVG of the second transparent common electrode CT2 can be set to be smaller and the aperture ratio can be more enhanced in the second embodiment in which an interval LGG between the gate lines GL is set to be smaller than the width L of the transparent pixel electrode PIT.

FIGS. 20A to 25B illustrate a method of manufacturing the liquid crystal display device LCD according to the second embodiment. FIGS. 20A to 25B illustrate steps of manufacturing the thin film transistor TFT, the wiring region, and the aperture portion formed on the second transparent substrate SUB2 in the second embodiment. The manufacturing steps are illustrated by a plan view of one pixel and a sectional view taken along the line b-b' of the plan view. Each figure is basically shown on the basis of a photolithography step during the TFT process. Note that, a first photolithography step and a second photolithography step are each illustrated through use of two figures so as to facilitate the description of a half-tone exposure step.

Figure 20A:
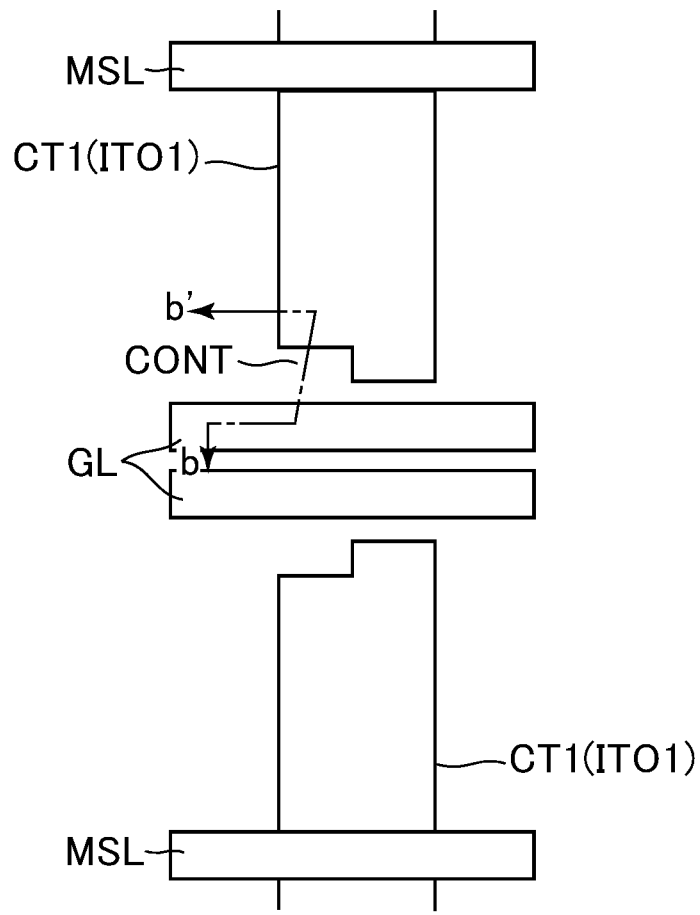
FIGS. 20A and 20B are views each illustrating a method of manufacturing a liquid crystal display device according to the second embodiment of the present application.
Figure 20B:
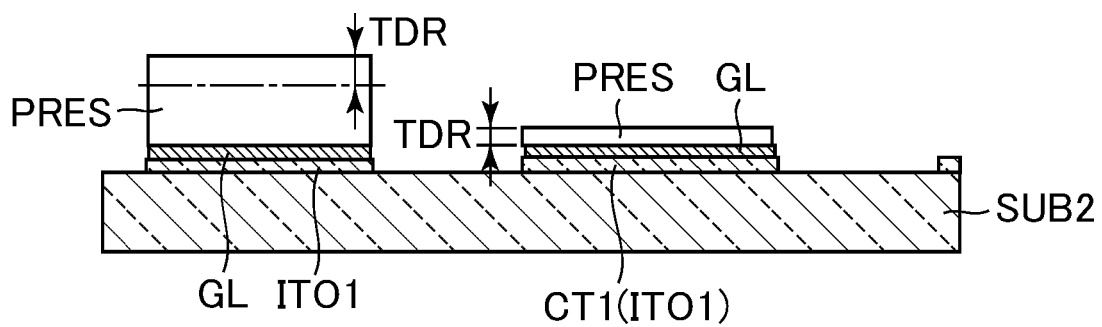
Figure 21A:
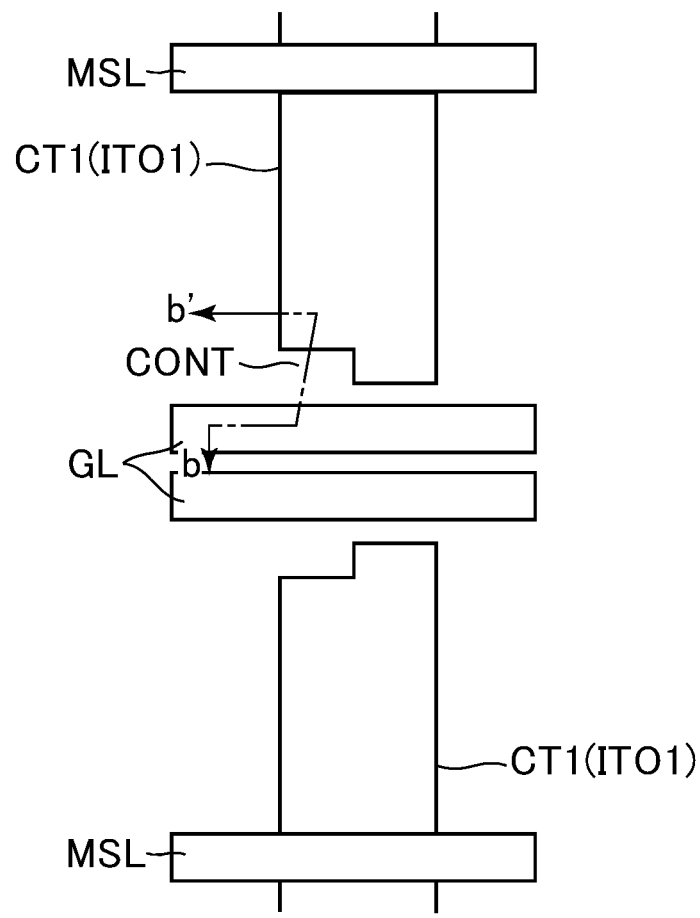
FIGS. 21A and 21B are views each illustrating the method of manufacturing a liquid crystal display device according to the second embodiment of the present application.
Figure 21B:
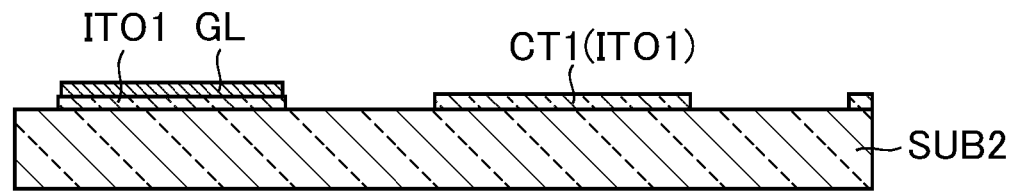

FIGS. 20A and 20A are each a plan view of one pixel and FIGS. 20B and 20B are each a sectional view taken along the line b-b' of the corresponding plan view after the completion of the first photolithography step of the thin film transistor TFT on the second transparent substrate SUB2, which correspond to FIGS. 8A, 8B, 9A, and 9B of the first embodiment. In the first photolithography step illustrated in FIGS. 20A, 20B, 21A, and 21B, patterns of two adjacent gate lines GL, the common electrode metal wiring MSL, and region of the first transparent common electrode CT1 connected to the common electrode metal wiring MSL are formed.

Figure 22A:
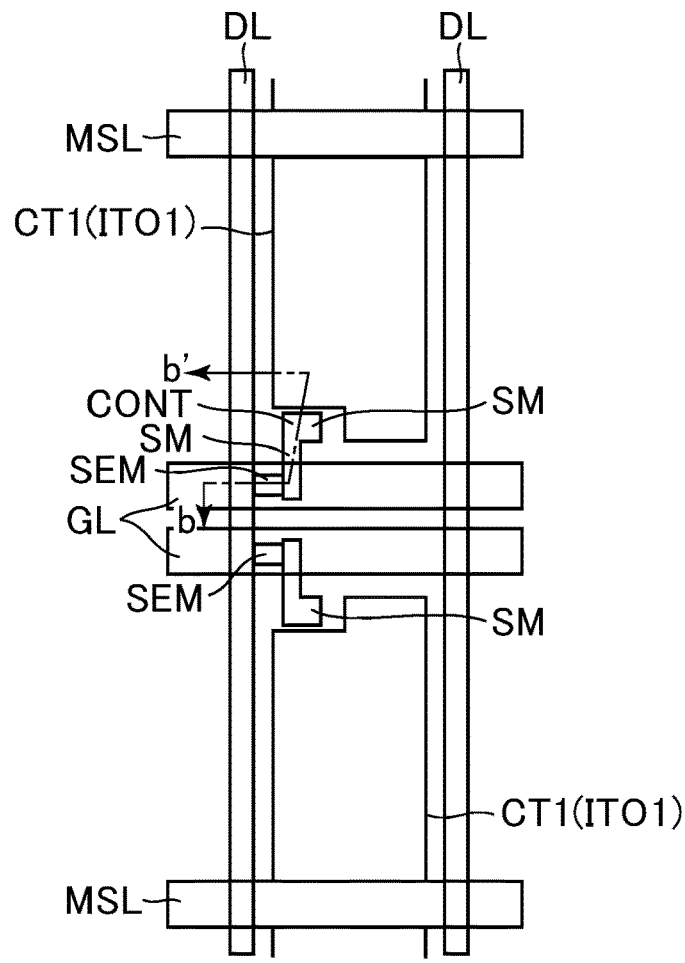
FIGS. 22A and 22B are views each illustrating the method of manufacturing a liquid crystal display device according to the second embodiment of the present application.
Figure 22B:
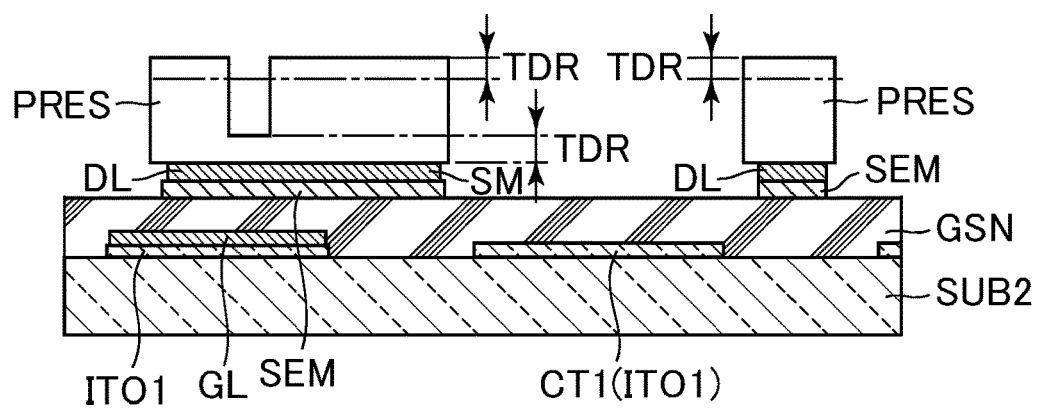
Figure 23A:
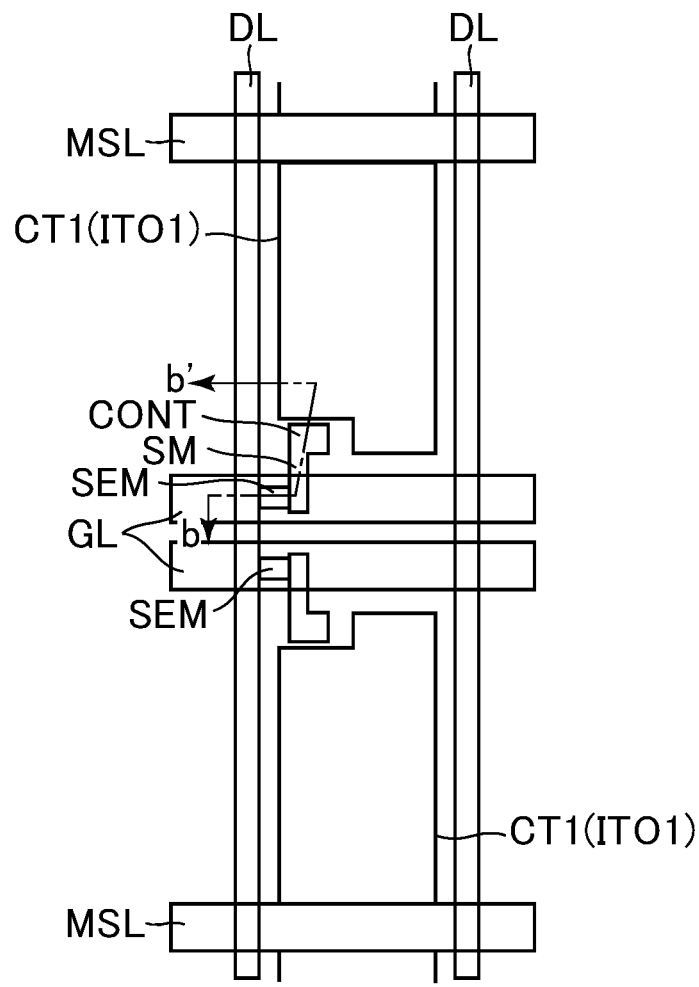
FIGS. 23A and 23B are views each illustrating the method of manufacturing a liquid crystal display device according to the second embodiment of the present application.
Figure 23B:
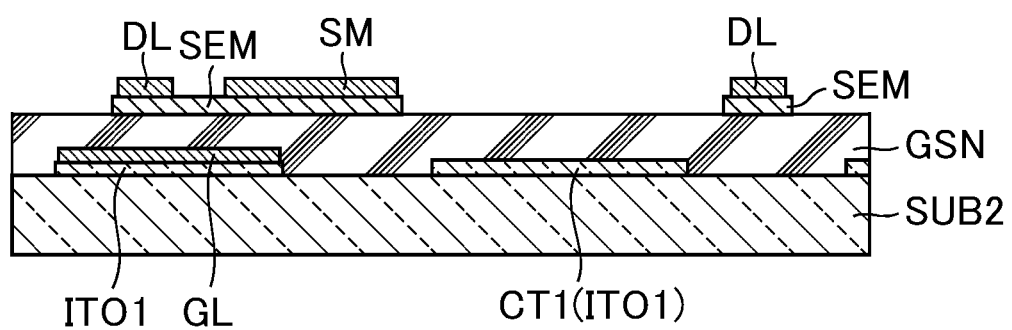
Figure 24A:
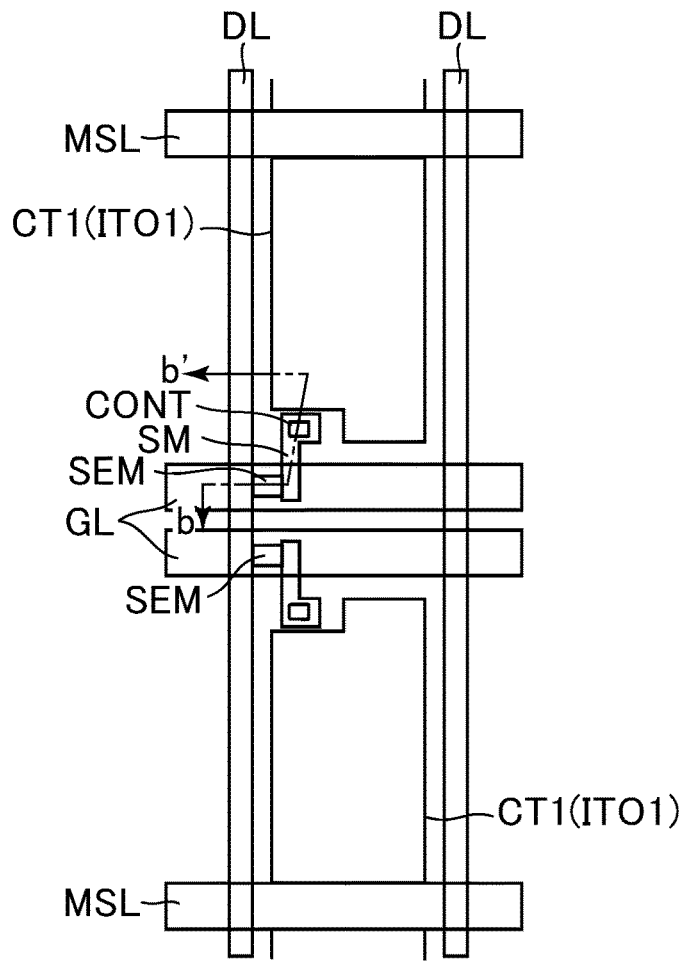
FIGS. 24A and 24B are views each illustrating the method of manufacturing a liquid crystal display device according to the second embodiment of the present application.
Figure 24B:
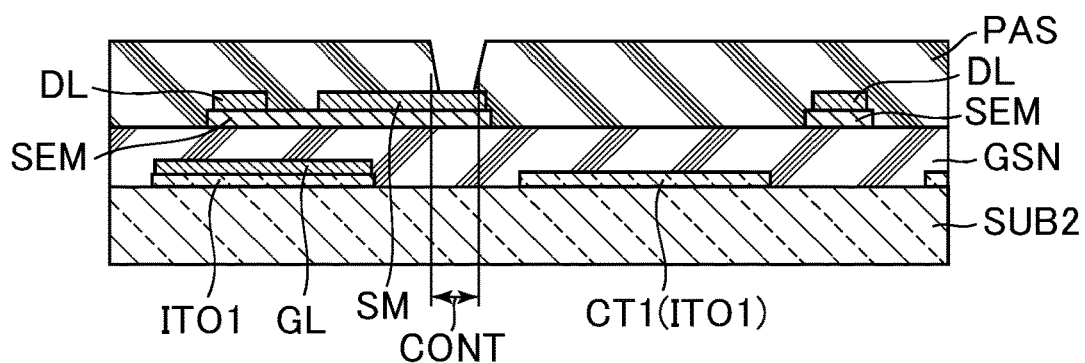
Figure 25A:
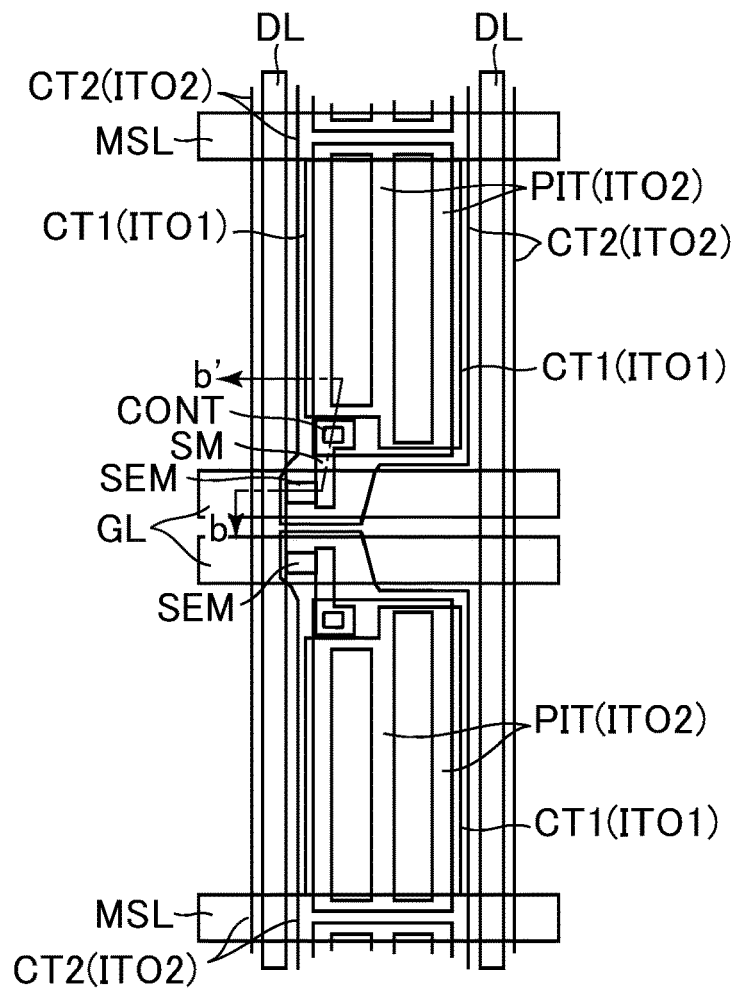
FIGS. 25A and 25B are views each illustrating the method of manufacturing a liquid crystal display device according to the second embodiment of the present application.
Figure 25B:
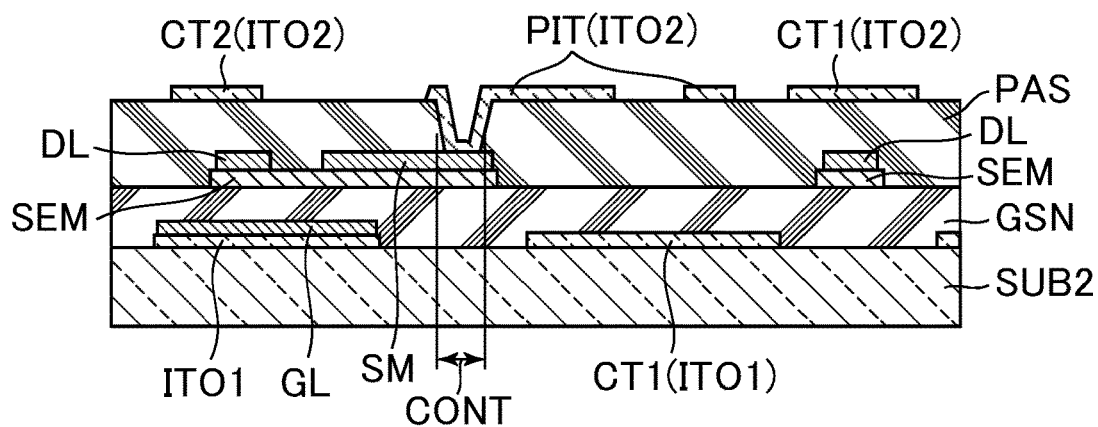

FIGS. 22B and 23B are sectional view at a time after the second photolithography step is completed, which correspond to FIGS. 10B and 11B of the first embodiment. FIGS. 24A and 24B are a plan view of one pixel and a sectional view thereof at a time of the completion of a third photolithography step, which correspond to FIGS. 12A and 12B of the first embodiment. FIGS. 25A and 25B are a plan view of one pixel and a sectional view thereof after the completion of a fourth photolithography step, which correspond to FIGS. 13A and 13B of the first embodiment. The method of manufacturing the liquid crystal display device LCD according to the second embodiment is basically the same as that of the first embodiment, and hence detailed description thereof is omitted.

As described above, also in the second embodiment, the number of the photolithography steps can be suppressed to four, and hence a liquid crystal display device LCD can also be achieved with low cost in the same way as in the first embodiment. Further, in the second embodiment, a liquid crystal display device LCD having a higher aperture ratio, higher transmittance, and lower power consumption can be realized, as compared to the first embodiment.

Third Embodiment

Figure 26:
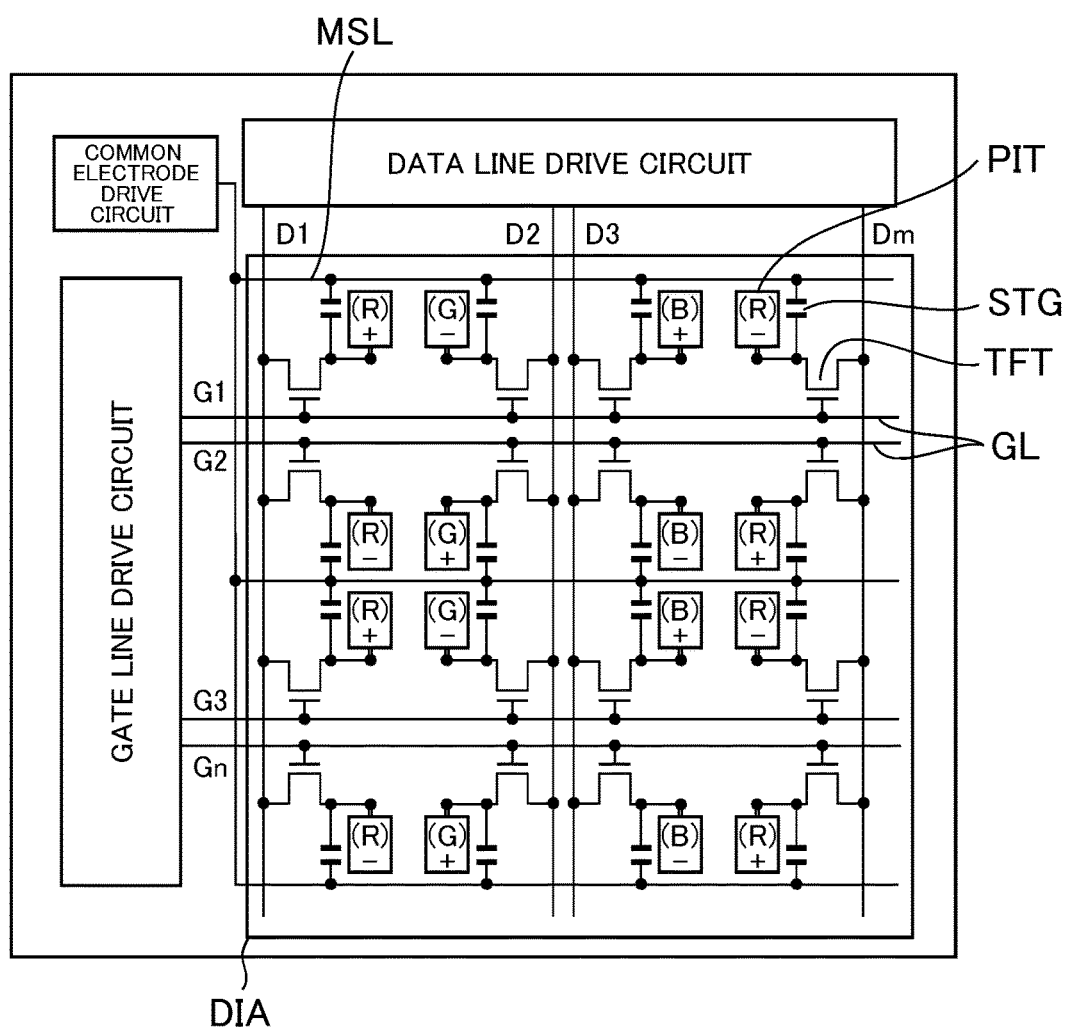
FIG. 26 is a view illustrating a system and an equivalent circuit of a liquid crystal display device according to a third embodiment of the present application.
Figure 27:
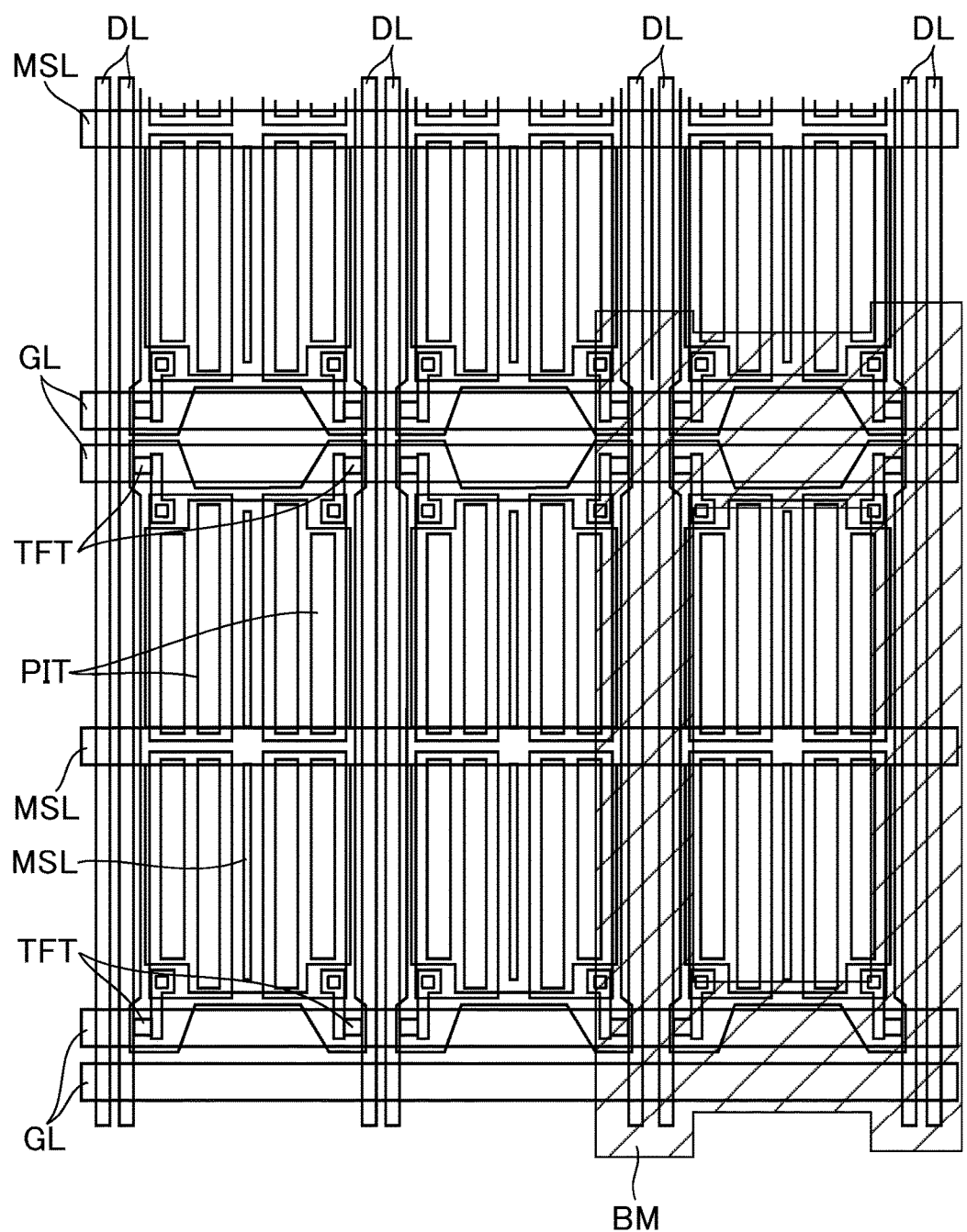
FIG. 27 is a plan view of a plurality of pixels of the liquid crystal display device illustrated in FIG. 26.

FIG. 26 is a view illustrating a system and an equivalent circuit of a liquid crystal display device LCD according to a third embodiment of the present application, which corresponds to FIG. 1 of the first embodiment. FIG. 27 is a plan view of a plurality of pixels of the liquid crystal display device LCD illustrated in FIG. 26, which corresponds to FIG. 2 of the first embodiment. FIG. 27 is a plan view of six pixels in a horizontal direction and three pixels in a vertical direction, that is, 18 pixels taken from the liquid crystal display device LCD. Unlike the first embodiment, in the third embodiment, two gate lines GL and two data lines DL each extend in parallel, and the black matrix BM shields light on a region of the two gate lines GL and the two data lines DL. Further, in the third embodiment, two upper and lower pixels share one common electrode metal wiring MSL. Among four upper, lower, left, and right pixels surrounded by the two gate lines GL and the two data lines DL, only the common electrode metal wiring MSL is present so as to block light, and no black matrix BM is formed. This configuration can also decrease variation in an aperture ratio caused by misalignment between the first transparent substrate SUB1 and the second transparent substrate SUB2, and consequently, the aperture ratio of each pixel can be enhanced.

Further, in the third embodiment, the plurality of transparent pixel electrodes PIT is arranged in a matrix form in which the first direction corresponds to a row and the second direction corresponds to a column. Further, the two gate lines GL are formed for two rows of a plurality of transparent pixel electrodes PIT, and the two gate lines GL are arranged between a plurality of transparent pixel electrodes PIT in an upper row and a plurality of transparent pixel electrodes PIT in a lower row. The two gate lines GL are each connected to the plurality of transparent pixel electrodes PIT in any one of the upper row and the lower row, which are located closer to the corresponding gate line GL, via a plurality of thin film transistors TFT. The second transparent common electrode CT2 covers the two gate lines GL.

Further, in the third embodiment, two data lines DL are formed for two columns of a plurality of transparent pixel electrodes PIT, and the two data lines DL are arranged between a plurality of transparent pixel electrodes PIT in a left column and a plurality of transparent pixel electrodes PIT in a right column. The two data lines DL are each connected to the plurality of transparent pixel electrodes PIT in any one of the left column and the right column, which are located closer to the corresponding data line DL, via a plurality of thin film transistors TFT. The second transparent common electrode CT2 covers the two data lines DL.

Figure 28:
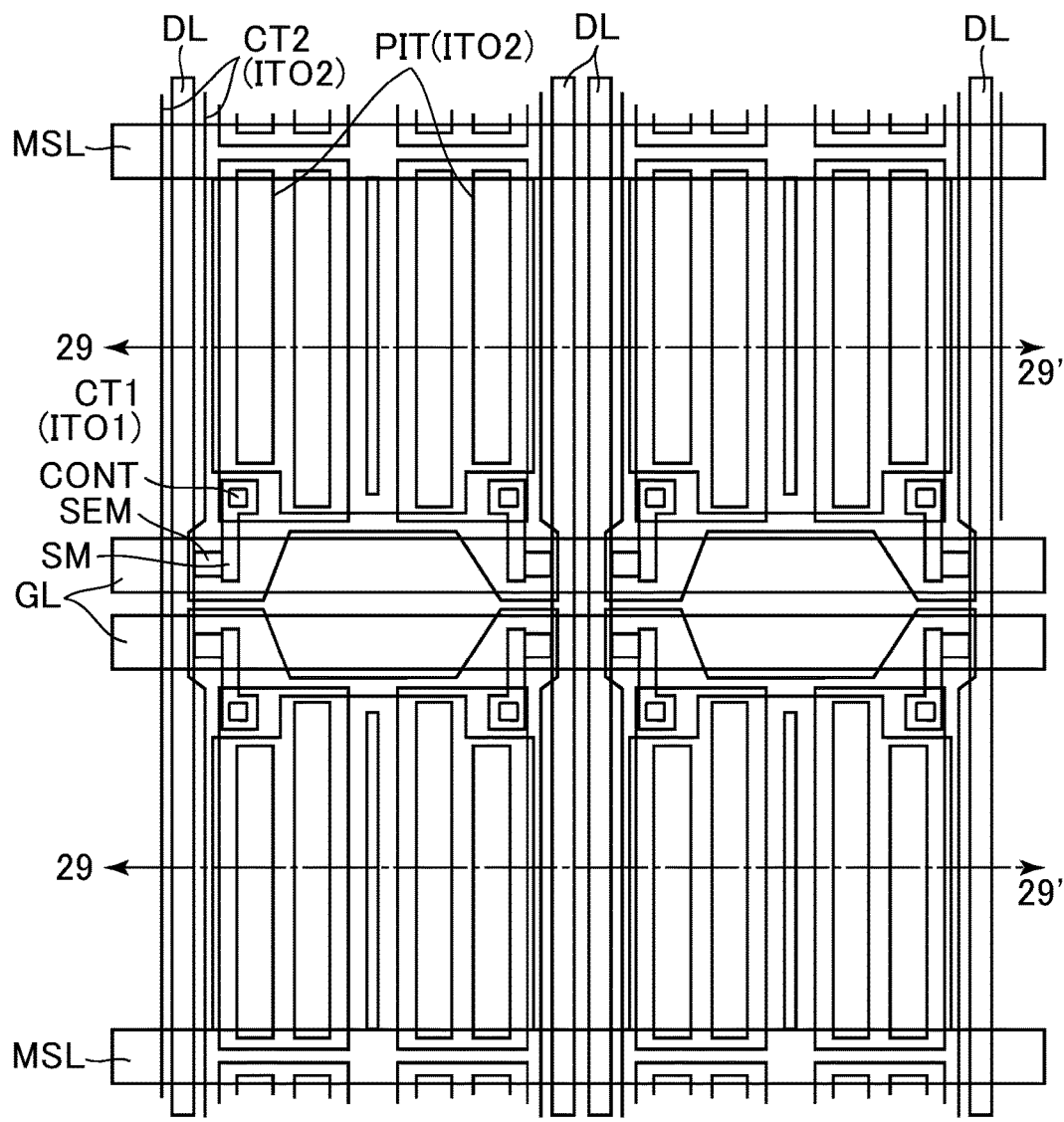
FIG. 28 is a plan view of four pixels taken from the liquid crystal display device illustrated in FIG. 27.

FIG. 28 is a plan view of 8 pixels taken from the liquid crystal display device LCD illustrated in FIG. 27, which corresponds to FIG. 3 of the first embodiment. FIG. 29 is a sectional view taken along the line 29-29' of the liquid crystal display device LCD illustrated in FIG. 28. In the third embodiment, the common electrode metal wiring MSL is shared by two upper and lower pixels, and hence an aperture ratio can be enhanced. Further, the common electrode metal wiring MSL is formed of an opaque material, and hence a boundary of pixels can be formed even without disposing the black matrix BM on the first transparent substrate SUB1. The alignment accuracy between the first transparent substrate SUB1 and the second transparent substrate SUB2 is low, and hence the aperture ratio can also be enhanced by the removal of the black matrix BM.

The first transparent common electrode CT1 is disposed widely above the two data lines DL arranged in parallel through intermediation of the protective insulating film PAS. In order to enhance a shield effect as described above, it is necessary that the second transparent common electrode CT2 covering the data lines DL be set to be larger than the width of the region of the two data lines DL. In the third embodiment, the gate lines GL extend in parallel for two rows of pixels, and in addition, the data lines DL extend in parallel for two columns of pixels. Therefore, as compared to the first embodiment in which the gate lines GL and the data lines DL are arranged at equal intervals for each pixel, the width of the second transparent common electrode CT2 can be set to be smaller than twice the dimension covering one wiring independently in the conventional-art example and hence the aperture ratio can be more enhanced in the third embodiment in which the intervals between the gate lines GL and between the data lines DL are set to be smaller than the width L of the transparent pixel electrode PIT.

FIG. 30 is an enlarged view of a sectional configuration of a portion of the two data lines DL extending in parallel illustrated in FIG. 29. The first transparent common electrodes CT1 are disposed on lower right and left sides of the data lines DL. The first common electrode CT1 serves to drive liquid crystal molecules with an electric field extending from the transparent pixel electrode PIT through the liquid crystal layer LC to reach the first transparent common electrode CT1. Further, the first common electrode CT1 serves to block electric field noise extending from the data line DL through the second transparent substrate SUB2 to reach the transparent pixel electrode PIT. On the other hand, the second transparent common electrode CT2 above the data lines DL serves to drive liquid crystal with an electric field extending from the transparent pixel electrodes PIT formed of the second transparent electrode material ITO2 formed on the protective insulating film PAS and serves to block electric field noise extending upward from the data line DL. Due to the effects of the second transparent common electrode CT2, the width of the black matrix BM can be reduced, and an aperture ratio can be enhanced. However, the second transparent common electrode CT2 covering the data lines DL extends off by the width LOVD, considering the alignment margin during the manufacturing steps with respect to the data lines DL. The extended end transmits a part of the electric field from the transparent pixel electrode PIT; however, the transmittance of the portion with the width LOVD is decreased. Therefore, the portion with the width LOVD needs to be as small as possible. As described above, in the first embodiment, one data line DL extends for each pixel, and an interval of the transparent common electrodes CT2 covering the data lines DL needs to be twice the extension width LOVD in addition to the data line DL width. In contrast, in the third embodiment, an interval LDD between two data lines DL arranged in parallel can be set to be smaller than twice the width LOVD, and hence an aperture ratio can be enhanced, with the result that a liquid crystal display device with high brightness and low power consumption can be provided.

As described above, the data lines DL or the gate lines GL are arranged in parallel and are allowed to share the transparent common electrode covering them, with the result that an aperture ratio is enhanced. Further, the transparent common electrode is shared by two or more pixels, and a region therebetween is not allowed to cross the data line or the gate line, whereby the aperture ratio is also enhanced. Further, the common electrode covering wiring from above and the pixel electrode are used separately as patterns made of the same material in the same plane, with the result that a substrate including the thin film transistors TFT can be manufactured by four photolithography steps, and a simple liquid crystal display device LCD of low cost is provided.

While there have been described what are at present considered to be certain embodiments of the application, it will be understood that various modifications may be made thereto, and it is intended that the appended claims cover all such modifications as fall within the true spirit and scope of the invention.

What is claimed is:

1. A liquid crystal display device, comprising:
a plurality of gate lines formed in a row direction on a first substrate;
a plurality of data lines formed in a column direction on the first substrate;
a first transparent common electrode formed on the first substrate;
a plurality of transparent pixel electrodes arranged in the row direction and the column direction and formed so as to be opposed to the first transparent common electrode;
an insulating film formed between the first transparent common electrode and the plurality of transparent pixel electrodes;
a plurality of thin film transistors connected to the plurality of transparent pixel electrodes, respectively;
a second transparent common electrode formed above the insulating film and formed in a same layer as the plurality of transparent pixel electrodes; and
a black matrix formed on a second substrate that is different from the first substrate,
wherein a pair of gate lines among the plurality of gate lines are formed between two rows of the plurality of transparent pixel electrodes,
the second transparent common electrode covers both of the pair of gate lines and a space between the pair of gate lines in a plan view,
the black matrix covers in a plan view both of the pair of gate lines and the space between the pair of gate lines, the portion of the black matrix covering the pair of gate lines and the space between the pair of gate lines has a width, and
a width of the second transparent common electrode is wider than the width of the portion of the black matrix.

2. The liquid crystal display device according to claim 1, wherein the pair of gate lines are arranged between transparent pixel electrodes in an upper row and transparent pixel electrodes in a lower row among the two rows,
a first gate line among the pair of gate lines is electrically connected to an upper row of the plurality of transparent pixel electrodes via a corresponding one of the plurality of thin film transistors,
a second gate line among the pair of gate lines is connected to a lower row of the plurality of transparent pixel electrodes via a corresponding one of the plurality of thin film transistors,
the first gate line is located closer to the upper row of the plurality of transparent pixel electrodes than the second gate line, and
the second gate line is located closer to the lower row of the plurality of transparent pixel electrodes than the first gate line.

3. The liquid crystal display device according to claim 1, further comprising: a common potential line for supplying a common potential,
wherein the common potential line is formed on and electrically connected to the first transparent common electrode, and the common potential line is formed between another two rows of the plurality of transparent pixel electrodes.

4. The liquid crystal display device according to claim 3, wherein the common potential line is formed in a same layer as the plurality of gate lines, and
the common potential line partly overlaps both one of the plurality of transparent pixel electrodes and the first transparent common electrode.

5. The liquid crystal display device according to claim 1, wherein the second transparent common electrode covers at least one of the plurality of data lines through the insulating film.

6. The liquid crystal display device according to claim 1, wherein the first transparent common electrode is between the plurality of transparent pixel electrodes and the first substrate.

7. The liquid crystal display device according to claim 1, further comprises:
another insulating film formed above the plurality of gate lines and the first transparent common electrode, and
the plurality of date lines are formed above the another insulating film.

8. The liquid crystal display device according to claim 1, further comprises:
   a liquid crystal layer formed on the insulating film, the plurality of transparent pixel electrodes and the second transparent common electrode.

9. The liquid crystal display device according to claim 1, wherein
   each of the pair of gate lines has a width,
   the width of the second transparent common electrode is greater than a total of the widths of the pair of gate lines.

* * * * *